US010345141B2

(12) United States Patent
Ledbetter

(10) Patent No.: US 10,345,141 B2
(45) Date of Patent: Jul. 9, 2019

(54) SYSTEM AND METHOD FOR VIBRATION ANALYSIS

(71) Applicant: Finley Lee Ledbetter, Argyle, TX (US)

(72) Inventor: Finley Lee Ledbetter, Argyle, TX (US)

( * ) Notice: Subject to any disclaimer, the term of this patent is extended or adjusted under 35 U.S.C. 154(b) by 943 days.

(21) Appl. No.: 14/024,869

(22) Filed: Sep. 12, 2013

(65) Prior Publication Data
US 2014/0069195 A1 Mar. 13, 2014

Related U.S. Application Data

(60) Provisional application No. 61/743,804, filed on Sep. 12, 2012, provisional application No. 61/765,024, filed on Feb. 14, 2013.

(51) Int. Cl.
*G01H 1/00* (2006.01)
*G01H 17/00* (2006.01)

(52) U.S. Cl.
CPC .............. *G01H 17/00* (2013.01); *G01H 1/00* (2013.01)

(58) Field of Classification Search
CPC .................................. G01H 1/00; G01H 17/00
USPC .......... 73/659, 660, 587, 579, 432.1
See application file for complete search history.

(56) References Cited

U.S. PATENT DOCUMENTS

| 5,251,151 | A | * | 10/1993 | Demjanenko | ............ | G01H 1/00 |
| | | | | | | 702/56 |
| 6,078,874 | A | * | 6/2000 | Piety | ...................... | G01H 1/003 |
| | | | | | | 702/122 |
| 6,215,408 | B1 | * | 4/2001 | Leonard | ............. | G01R 31/3274 |
| | | | | | | 324/415 |
| 7,225,109 | B2 | | 5/2007 | Frerichs et al. | | |
| 8,204,717 | B2 | | 6/2012 | McLaughlin et al. | | |
| 2012/0159604 | A1 | | 6/2012 | Bojinov et al. | | |
| 2014/0055886 | A1 | * | 2/2014 | Spangenberg | ......... | H01H 33/26 |
| | | | | | | 361/2 |

OTHER PUBLICATIONS

Continuous Monitoring of Circuit Breakers Using Vibration Analysis, by Hoidalen et al., IEEE Transactions on Power Delivery, vol. 20, No. 4, Oct. 2005, pp. 2458-2465.*
Vibration Analysis for Diagnostic Testing of Circuit-Breakers, by Runde et al., IEEE Transactions on Power Delivery, vol. 11, No. 4, Oct. 1996, pp. 1816-1823.*

(Continued)

*Primary Examiner* — Natalie Huls
*Assistant Examiner* — Suman K Nath
(74) *Attorney, Agent, or Firm* — Foley & Lardner LLP

(57) ABSTRACT

An exemplary analyzer, such as a circuit breaker analyzer, method, and system are provided for use in determining the mechanical condition of a device, such as a circuit breaker, appliance, machine, equipment, or other mechanical system. In one embodiment the analyzer is implemented using a smartphone or other smart device to couple to the device being analyzed to measure mechanical vibrations generated at a surface of the device during an operational event using a force detector, such as an accelerometer, and then comparing such measured values to a known, good signature of mechanical vibrations for the same type of operational event for same type of equipment.

45 Claims, 35 Drawing Sheets

(56) References Cited

OTHER PUBLICATIONS

Lerche, Morten, "Circuit Breaker Characteristics in Medium Voltage Equipment under Various Network Configurations," Technical University of Denmark, Department of Electrical Engineering, Jun. 30, 2009 (109 pages).
Zensol. CBV-X Vibration Circuit Breaker Analyzer. Zensol Automation Inc., Jan. 26, 2012 (Retrieved from the internet Feb. 4, 2014) URL: http:zensol.com/brochure/v1/CBVX.pdf>. (4 pages).
GTI Predictive. iPad Vibration Analyzer Application Demo. YouTube. Dec. 16, 2010. (Retrieved from the internet Feb. 14, 2014) URL: http://www.youtube.com/watch?v+5JCzUWBafio>. (2 pages).
Cadick, et al. "Determining Circuit Breaker Health Using a Novel Circuit Breaker Vibration Analysis Approach," Sep. 26, 2012 (Retrieved from the internet Feb. 4, 2014) URL: http://theammj.com/263pdf/circuitbreaker.pdf>. (18 pages).

\* cited by examiner

DATA POINTS FROM ACCELEROMETER OF DS BREAKER OPEN CHARGE CLOSE OPERATION

| DATE | TIME | X-AXIS | Y-AXIS | Z-AXIS |
|---|---|---|---|---|
| 2012:05:17 | 21:53:6 | 0.055 | −0.68 | −0.771 |
| 2012:05:17 | 21:53:6 | 0.043 | −0.678 | −0.76 |
| 2012:05:17 | 21:53:6 | 0.041 | −0.678 | −0.756 |
| 2012:05:17 | 21:53:6 | 0.04 | −0.685 | −0.749 |
| 2012:05:17 | 21:53:6 | 0.043 | −0.694 | −0.743 |
| 2012:05:17 | 21:53:6 | 0.051 | −0.684 | −0.771 |
| 2012:05:17 | 21:53:6 | 0.04 | −0.68 | −0.767 |
| 2012:05:17 | 21:53:6 | 0.03 | −0.679 | −0.756 |
| 2012:05:17 | 21:53:7 | 0.025 | −0.684 | −0.741 |
| 2012:05:17 | 21:53:7 | 0.036 | −0.681 | −0.734 |
| 2012:05:17 | 21:53:7 | 0.044 | −0.68 | −0.743 |
| 2012:05:17 | 21:53:7 | 0.052 | −0.676 | −0.745 |
| 2012:05:17 | 21:53:7 | 0.059 | −0.675 | −0.747 |
| 2012:05:17 | 21:53:7 | 0.056 | −0.676 | −0.756 |
| 2012:05:17 | 21:53:7 | 0.055 | −0.676 | −0.763 |
| 2012:05:17 | 21:53:7 | 0.05 | −0.678 | −0.758 |
| 2012:05:17 | 21:53:7 | 0.045 | −0.679 | −0.769 |
| 2012:05:17 | 21:53:8 | 0.043 | −0.676 | −0.767 |
| 2012:05:17 | 21:53:8 | 0.046 | −0.675 | −0.764 |
| 2012:05:17 | 21:53:8 | 0.044 | −0.676 | −0.757 |
| 2012:05:17 | 21:53:8 | 0.037 | −0.681 | −0.757 |
| 2012:05:17 | 21:53:8 | 0.03 | −0.682 | −0.753 |
| 2012:05:17 | 21:53:8 | 0.037 | −0.68 | −0.753 |
| 2012:05:17 | 21:53:8 | 0.04 | −0.678 | −0.753 |
| 2012:05:17 | 21:53:8 | 0.049 | −0.675 | −0.765 |
| 2012:05:17 | 21:53:8 | 0.052 | −0.669 | −0.767 |
| 2012:05:17 | 21:53:8 | 0.055 | −0.669 | −0.773 |
| 2012:05:17 | 21:53:9 | 0.046 | −0.679 | −0.761 |
| 2012:05:17 | 21:53:9 | 0.036 | −0.68 | −0.75 |
| 2012:05:17 | 21:53:9 | 0.034 | −0.684 | −0.757 |
| 2012:05:17 | 21:53:9 | 0.033 | −0.677 | −0.771 |
| 2012:05:17 | 21:53:9 | 0.043 | −0.669 | −0.776 |
| 2012:05:17 | 21:53:9 | 0.008 | −0.696 | −0.734 |
| 2012:05:17 | 21:53:9 | 0.014 | −0.685 | −0.717 |
| 2012:05:17 | 21:53:9 | 0.043 | −0.661 | −0.732 |
| 2012:05:17 | 21:53:9 | 0.057 | −0.645 | −0.752 |
| 2012:05:17 | 21:54:0 | 0.041 | −0.662 | −0.767 |
| 2012:05:17 | 21:54:0 | 0.022 | −0.682 | −0.751 |
| 2012:05:17 | 21:54:0 | 0.019 | −0.69 | −0.764 |
| 2012:05:17 | 21:54:0 | 0.017 | −0.673 | −0.756 |
| 2012:05:17 | 21:54:0 | 0.053 | −0.651 | −0.806 |
| 2012:05:17 | 21:54:0 | 0.074 | −0.649 | −0.813 |

FROM FIG. 7A

| | | | | |
|---|---|---|---|---|
| 2012:05:17 | 21:54:0 | 0.048 | −0.628 | −0.833 |
| 2012:05:17 | 21:54:0 | 0.077 | −0.63 | −0.86 |
| 2012:05:17 | 21:54:0 | 0.099 | −0.681 | −0.817 |
| 2012:05:17 | 21:54:0 | 0.159 | −0.643 | −0.85 |
| 2012:05:17 | 21:54:1 | 0.119 | −0.61 | −0.893 |
| 2012:05:17 | 21:54:1 | 0.069 | −0.619 | −0.837 |
| 2012:05:17 | 21:54:1 | 0.015 | −0.641 | −0.76 |
| 2012:05:17 | 21:54:1 | −0.053 | −0.638 | −0.737 |
| 2012:05:17 | 21:54:1 | −0.114 | −0.603 | −0.858 |
| 2012:05:17 | 21:54:1 | −0.165 | −0.578 | −0.704 |
| 2012:05:17 | 21:54:1 | −0.177 | −0.568 | −0.646 |
| 2012:05:17 | 21:54:1 | −0.125 | −0.657 | −0.581 |
| 2012:05:17 | 21:54:1 | −0.078 | −0.708 | −0.543 |
| 2012:05:17 | 21:54:2 | −0.004 | −0.692 | −0.576 |
| 2012:05:17 | 21:54:2 | −0.028 | −0.667 | −0.619 |
| 2012:05:17 | 21:54:2 | −0.027 | −0.634 | −0.515 |
| 2012:05:17 | 21:54:2 | −0.082 | −0.634 | −0.656 |
| 2012:05:17 | 21:54:2 | −0.184 | −0.637 | −0.74 |
| 2012:05:17 | 21:54:2 | −0.23 | −0.638 | −0.751 |
| 2012:05:17 | 21:54:2 | −0.222 | −0.645 | −0.772 |
| 2012:05:17 | 21:54:2 | −0.237 | −0.757 | −0.773 |
| 2012:05:17 | 21:54:2 | −0.286 | −0.728 | −0.804 |
| 2012:05:17 | 21:54:3 | −0.35 | −0.627 | −0.869 |
| 2012:05:17 | 21:54:3 | −0.363 | −0.546 | −0.808 |
| 2012:05:17 | 21:54:3 | −0.341 | −0.537 | −0.744 |
| 2012:05:17 | 21:54:3 | −0.322 | −0.546 | −0.744 |
| 2012:05:17 | 21:54:3 | −0.316 | −0.534 | −0.667 |
| 2012:05:17 | 21:54:3 | −0.326 | −0.453 | −0.66 |
| 2012:05:17 | 21:54:3 | −0.323 | −0.487 | −0.639 |
| 2012:05:17 | 21:54:3 | −0.521 | −0.636 | −0.788 |
| 2012:05:17 | 21:54:3 | −0.318 | −0.532 | −1.051 |
| 2012:05:17 | 21:54:3 | −0.512 | −0.408 | −1.068 |
| 2012:05:17 | 21:54:4 | −0.559 | −0.422 | −0.978 |
| 2012:05:17 | 21:54:4 | −0.617 | −0.433 | −0.867 |
| 2012:05:17 | 21:54:4 | −0.664 | −0.43 | −0.816 |
| 2012:05:17 | 21:54:4 | −0.747 | −0.4 | −0.834 |
| 2012:05:17 | 21:54:4 | −0.708 | −0.313 | −0.848 |
| 2012:05:17 | 21:54:4 | −0.667 | −0.33 | −0.798 |
| 2012:05:17 | 21:54:4 | −0.564 | −0.428 | −0.737 |
| 2012:05:17 | 21:54:4 | −0.496 | −0.422 | −0.771 |
| 2012:05:17 | 21:54:4 | −0.566 | −0.347 | −0.88 |
| 2012:05:17 | 21:54:4 | −0.583 | −0.327 | −0.926 |
| 2012:05:17 | 21:54:5 | −0.573 | −0.344 | −0.874 |

FROM FIG. 7B

| | | | | |
|---|---|---|---|---|
| 2012:05:17 | 21:54:5 | −0.621 | −0.419 | −0.751 |
| 2012:05:17 | 21:54:5 | −0.656 | −0.347 | −0.726 |
| 2012:05:17 | 21:54:5 | −0.686 | −0.236 | −0.653 |
| 2012:05:17 | 21:54:5 | −0.724 | −0.219 | −0.609 |
| 2012:05:17 | 21:54:5 | −0.789 | −0.08 | −0.523 |
| 2012:05:17 | 21:54:5 | −0.827 | −0.174 | −0.555 |
| 2012:05:17 | 21:54:5 | −0.791 | −0.245 | −0.589 |
| 2012:05:17 | 21:54:5 | −0.804 | −0.266 | −0.575 |
| 2012:05:17 | 21:54:6 | −0.786 | −0.389 | −0.647 |
| 2012:05:17 | 21:54:6 | −0.841 | −0.254 | −0.57 |
| 2012:05:17 | 21:54:6 | −0.883 | −0.2 | −0.566 |
| 2012:05:17 | 21:54:6 | −0.884 | −0.116 | −0.519 |
| 2012:05:17 | 21:54:6 | −0.895 | −0.091 | −0.51 |
| 2012:05:17 | 21:54:6 | −0.85 | −0.032 | −0.53 |
| 2012:05:17 | 21:54:6 | −0.771 | −0.007 | −0.538 |
| 2012:05:17 | 21:54:6 | −0.699 | −0.019 | −0.516 |
| 2012:05:17 | 21:54:6 | −0.661 | −0.076 | −0.491 |
| 2012:05:17 | 21:54:6 | −0.625 | −0.13 | −0.484 |
| 2012:05:17 | 21:54:7 | −0.548 | −0.117 | −0.41 |
| 2012:05:17 | 21:54:7 | −0.722 | −0.075 | −0.344 |
| 2012:05:17 | 21:54:7 | −0.928 | 0.071 | −0.25 |
| 2012:05:17 | 21:54:7 | −0.925 | 0.117 | −0.289 |
| 2012:05:17 | 21:54:7 | −0.872 | 0.186 | −0.356 |
| 2012:05:17 | 21:54:7 | −1.257 | 0.412 | −0.522 |
| 2012:05:17 | 21:54:7 | −1.034 | 0.148 | −0.488 |
| 2012:05:17 | 21:54:7 | −0.926 | −0.049 | −0.472 |
| 2012:05:17 | 21:54:7 | −1.014 | −0.016 | −0.55 |
| 2012:05:17 | 21:54:8 | −1.088 | −0.009 | −0.636 |
| 2012:05:17 | 21:54:8 | −0.966 | −0.078 | −0.604 |
| 2012:05:17 | 21:54:8 | −0.907 | −0.044 | −0.51 |
| 2012:05:17 | 21:54:8 | −0.932 | 0.028 | −0.387 |
| 2012:05:17 | 21:54:8 | −0.704 | 0.062 | −0.376 |
| 2012:05:17 | 21:54:8 | −0.52 | 0.106 | −0.331 |
| 2012:05:17 | 21:54:8 | −0.405 | 0.204 | −0.196 |
| 2012:05:17 | 21:54:8 | −0.471 | 0.108 | −0.215 |
| 2012:05:17 | 21:54:8 | −1.937 | 1.228 | −0.766 |
| 2012:05:17 | 21:54:8 | −0.345 | 0.035 | −0.27 |
| 2012:05:17 | 21:54:9 | −1.547 | −1.241 | −0.271 |
| 2012:05:17 | 21:54:9 | −0.069 | 0.07 | −0.557 |
| 2012:05:17 | 21:54:9 | −0.57 | −0.062 | −0.721 |
| 2012:05:17 | 21:54:9 | −0.69 | 0.001 | −0.732 |
| 2012:05:17 | 21:54:9 | −0.741 | 0.037 | −0.807 |
| 2012:05:17 | 21:54:9 | −0.77 | −0.046 | −0.662 |

FIG. 7C

| | | | | | | | New Equipment | | |
|---|---|---|---|---|---|---|---|---|---|
| Company △ | Plant # | Substation | Breaker ID △ | Type △ | Serial Number △ | Last Profile | Profiles History △ | | |
| Electric Co. | Dallas Main Plant | A2 | 1234 | B2 | 23231 | 2012-10-06 | View | Edit | Delet |
| Light & Bolt | Central Station | F32 | D42 | B1 | we390 | 2012-06-02 | View | Edit | Delet |
| Light & Bolt | New Jersey | A2 | 111 | B3 | HHR222 | 2010-04-22 | View | Edit | Delet |
| Texas Energy Inc. | Allen | F2 | 222 | B4 | 2-233 | 2011-10-05 | View | Edit | Delet |
| Texas Energy Inc. | San Francisco Bay | SS2 | 17672 | B4 | 89NN3 | 2011-01-07 | View | Edit | Delet |

FIG. 13B

New Equipment — 604

Plant: Texas Main Plant
Substation or Panel Designation: A2
Breaker Type: Choose Breaker Type
Breaker Serial Number: 12345
Circuit Designation: B3

Notes

Image

Browse

Cancel  Save

FIG. 13C

← → × ⌂ http://www.cbanalyzer.com

CB Analyzer

🔍

── 606

Company, INC.

Home  Testimonials  Instructions  :User's Area:  Evaluation  Support  Contact Us 🔍 search My Equipment
My Profiles
My Account

| Plant | △ | Substation | Breaker ID | Type △ | Serial Number △ | Test ID | Test Date | User | Result |
|---|---|---|---|---|---|---|---|---|---|
| Dallas Main Plant | | A2 | 1234 | B2 | 20231 | 128 | 2012-06-10 | jsmith | ✓ |
| Central Station | | F32 | 4967 | B1 | wle090 | 496 | 2012-06-02 | XX | ✓ |
| Central Station | | F32 | 4967 | B1 | wle090 | 496 | 2012-04-01 | XX | ○ |

Home | Terms of Use | Company | Contact Us

FIG. 13D

E-mail

From: CBAnalyzer tests@cbanalyzer.com
To: mke@whatever.com
Cc:
Subject: CBAnalyzer Test Results - Breaker 767612

CBAnalyzer

This is your test results for Breaker ID 767612:

This test meets known good signature for this equipment. ✓

Check your account here or paste this URL in your browser:
http://www.cbanalyzer.com/index/a3FdgA2

FIG. 14

SYSTEM AND METHOD FOR VIBRATION ANALYSIS

CROSS-REFERENCE TO RELATED APPLICATIONS

Pursuant to 35 U.S.C. § 119(e), this application claims priority from, and hereby incorporates by reference for all purposes, U.S. Provisional Patent Application Ser. No. 61/743,804, entitled "Circuit Breaker Analyzer," filed Sep. 12, 2012, and U.S. Provisional Patent Application Ser. No. 61/765,024, entitled "Circuit Breaker Analyzer," filed Feb. 14, 2013, both naming Finley Lee Ledbetter as inventor.

TECHNICAL FIELD

The present invention relates generally to the field of vibration analysis and more particularly, but not by way of limitation, to an analyzer system and method to determine the mechanical condition of a device, such as a circuit breaker, appliance, machine, equipment, or other mechanical system.

BACKGROUND

The reliable mechanical operation and condition of appliances, machinery, and equipment, such as industrial appliances, are critical to not only the economic success of an operation or business, but also to the safety of personnel, property, and the equipment itself. Such operations and businesses may include, for example, factories, refineries, hospitals, storage facilities, data centers, retail establishments, and manufacturing facilities. As such, the regular and routine maintenance and testing of the mechanical operation and condition of such equipment is necessary and critical. Similarly, as equipment parts become worn or damaged, these conditions should be expeditiously identified and corrected as needed.

Unfortunately, although regular and routine maintenance is necessary and critical, it is often time consuming, requires specialized knowledge, often requires dedicated technical personnel and equipment, and is expensive and disruptive. Depending on the operation or process, such as a manufacturing process, the time that equipment is off-line to perform testing can interrupt production schedules and harm overall business operations. The risk of inadvertently damaging equipment while disassembling and reassembling (which is often required) for testing or improperly performing a test is significant. Any unexpected or improperly handled step may needlessly extend an equipment outage resulting in operational losses.

Further, many testing procedures are inefficient, imprecise, not properly performed, and may result in replacing parts that do not need to be replaced. All of these issues cause significant economic harm.

Similarly, the testing itself can be expensive, separate and apart from the other issues just discussed. For a variety of reasons, businesses often do not have the economic resources to employ technical personnel to perform needed testing, and the costs to hire third party contractors can also be economically challenging. Such testing, however, can be critical to the economic viability of an operation as well as to provide a safe operating environment to protect both life and property. For example, NFPA 70E: Standard for Electrical Safety involves workplace safety regulations that require certain electrical equipment performance that must be met to ensure a safe working environment as well as compliance with safety regulations, such as OSHA regulations. As another example, with respect to electric circuit breakers, it is often cost prohibitive to take circuit breakers, along with associated equipment powered through such circuit breakers, out of service for testing.

Further, such performance tests of the mechanical operations of a device may be inaccurate and result in wrong conclusions. For example, the testing of the mechanical operations of a circuit breaker is difficult, time consuming, and results may be incorrect.

For example, depending on the voltage and/or current rating of a circuit breaker, often an electrical arc is generated when the circuit breaker is tripped. Various techniques are used in circuit breakers to arrest such electrical arcs to minimize any damage they may cause. Electrical arcing in circuit breakers are a known hazard and risk. The speed in which a breaker opens when an open circuit or "trip" signal is received may affect the arc hazard and other safety issues regarding the amount of current that is allowed to pass through the circuit breaker to other equipment and network elements. In most situations, the faster a breaker opens, the better. When a circuit breaker remains in a closed state for extended periods of time, however, the supporting mechanical parts and systems may deteriorate or result in a condition or state in which the circuit breaker will not open as quickly as desired. This may be caused by any number of reasons, such as, for example, oxidation, galling, loss of vacuum, and/or uneven or undesirable lubrication distribution within the mechanical systems and/or parts. This problem is difficult to diagnose because of the inability to easily replicate these conditions when testing the mechanical properties of a circuit breaker. In fact, once a circuit breaker is opened and closed, negative performance issues caused by extended periods of inactivity, such as, for example, galling and inadequate lubrication, are overcome (for the time being), and are very difficult if not impossible to detect through conventional circuit breaker testing. Unfortunately, the condition of extended circuit breaker trip inactivity is often overlooked and/or not tested. This may result in inaccurate testing, inadequate maintenance, and increased safety risks. The difficulties of effectively and efficiently testing mechanical systems of other equipment, systems and devices are well known.

SUMMARY

In accordance with the present invention, an analyzer, such as a circuit breaker analyzer, is provided that substantially eliminates one or more of the disadvantages and problems outlined above. Although, for ease of description and example purposes, the present disclosure primarily describes various aspects of the analyzer implemented as an electrical circuit breaker analyzer to easily, effectively and economically measure the vibrations corresponding to the mechanical operation of a circuit breaker, it should be understood at the outset that the present invention is not so limited. In fact, the present invention may, in certain embodiments, be implemented as a device to measure, record and analyze mechanical vibrations generated during the operation of virtually any machine, device, or equipment. For example, the mechanical vibrations generated during the operation of a motor, generator, furnace, blower, refrigeration unit, washing machine, dryer, vehicle, motorcycle, windmill, airplane, engine, turbine, hoist, jack, compressor, disposal, hard disk drive, computer, actuator, fan, and pump.

According to an exemplary aspect of the present invention, a method for performing vibration analysis of the operation of a circuit breaker (or other device) is provided to analyze the mechanical condition of the circuit breaker (or other device).

The various embodiments and implementations of the present invention may provide a profusion of potential technical advantages and benefits. A technical advantage of the present invention may include the capability to more efficiently and effectively test and monitor the mechanical operation and health of industrial equipment to optimize and/or reduce overall maintenance costs. Such testing may increase and/or improve overall reliability of such equipment, which may also increase overall safety associated with the operation of such industrial equipment and related systems.

Still yet another technical advantage of the present invention may include the capability to reduce the negative effects of environmental elements by optimizing equipment maintenance and overall usage.

Other technical advantages may be readily apparent to one skilled in the art after review of the following figures and description associated herewith.

BRIEF DESCRIPTION OF THE DRAWINGS

For a more complete understanding of the present disclosure and the advantages thereof, reference is now made to the following brief description of the drawings, taken in connection with the accompanying drawings and detailed description, wherein like reference numerals represent like parts, in which:

FIGS. 7A, 7B and 7C comprise a data table that illustrates exemplary data measurements taken by the analyzer of mechanical vibrations produced by the circuit breaker during an operational event(s) using an accelerometer or force detector that can measure mechanical vibration forces along three axes;

FIGS. 13A, 13B, 13C, 13D, and 13E are various circuit breaker analyzer system output, report and user interfaces implemented, in this example, as a web interface;

FIG. 14 is an example electronic test results report implemented as an electronic mail indicating, in this example, that the tested circuit breaker matches a known good signature for this type of circuit breaker;

DETAILED DESCRIPTION

Figure 1:
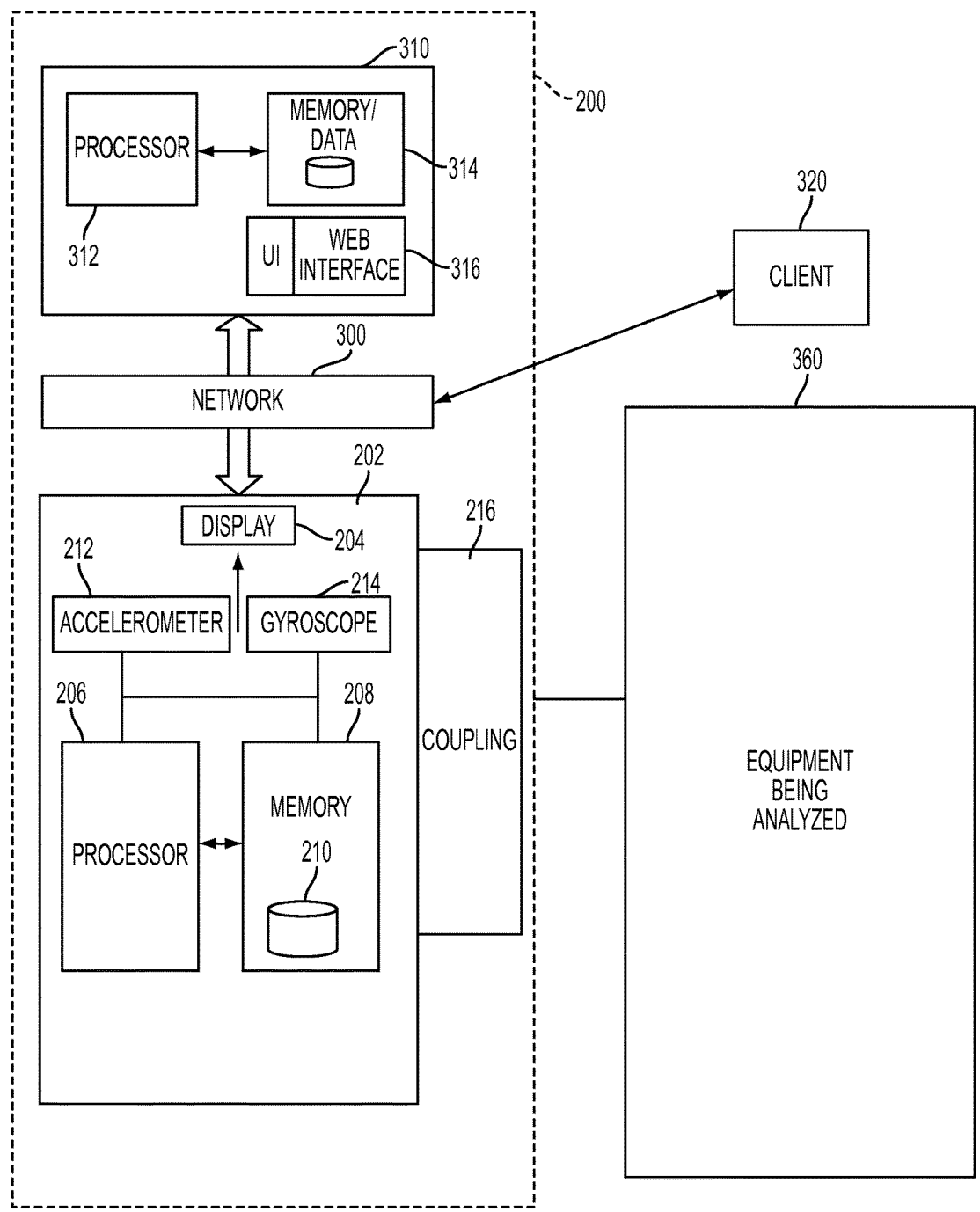
FIG. 1 is a block diagram of a vibration analysis system that includes an analyzer, such as a circuit breaker analyzer, and a piece of equipment to be analyzed, such as a circuit breaker, as well as alternative implementations that may include a remote or web enabled server and client.

It should be understood at the outset that although an exemplary implementation of the present invention is illustrated below for use with circuit breakers, the present invention may be implemented using any number of techniques, whether currently known or in existence, to measure, record and analyze mechanical vibrations generated during the operation of virtually any machine, device, or equipment. The present invention should in no way be limited to the exemplary implementations, drawings, and techniques illustrated below, including the exemplary design and implementation illustrated and described herein. Additionally, the drawings contained herein are not necessarily drawn to scale.

Circuit breakers are used throughout industrialized countries to ensure that electrical power is safely and effectively delivered to equipment and systems. Circuit breakers, at their essence, are electrical switches designed to open to protect electrical devices and equipment from short circuits, current overloads, and the like that may damage or destroy such electrical equipment or cause safety concerns. Circuit breakers, depending on their implementation, include complex mechanical and electrical systems. Circuit breakers may be reset, either manually or automatically, and used again, unlike a fuse.

Generally, circuit breakers may be categorized according to their electrical capacities, such as current and voltage ratings, as well as the technology used to sense current and voltage, as well as the configurations and supporting mechanical systems used to open and close the electrical contacts to interrupt and connect the electrical current flow.

When disturbances or undesirable conditions, such as high current or high voltage conditions, are detected, the circuit breaker responds by opening the switch by separating the one or more electrical contacts of the circuit breaker from one another. This may be referred to as a "trip" of the circuit breaker. Generally, this should be done as quickly as possible to avoid or minimize potential damage to electrical equipment that may be destroyed or damaged by the high current or voltage condition. In other circumstances, high currents may overheat equipment and cause a fire.

As such, the reliable and effective operation of the supporting mechanical parts and systems of a circuit breaker are essential to ensure that the electrical contacts of a circuit breaker will reliably and quickly open. These supporting mechanical parts and systems may include, for example, closing springs, cams, shafts, gears, crank arms, ratchet wheels, bushings, pawl lifters, drive pawls, hold pawls, rollers, drive plates, motors, cranks, etc. In some implementations, these mechanical parts and systems may be vacuum sealed in a circuit breaker. Such circuit breakers may also be referred to as a vacuum circuit breaker or vacuum interrupter. These mechanical parts and systems may become worn or damaged, which may reduce reliability and the time it takes for the electrical contacts to open. Lubrication quality or quantity, or lack thereof, will also affect the operation of these mechanical systems. In the case of a vacuum interrupter, the loss of vacuum will also affect the operation of the circuit breaker.

The supporting mechanical parts and systems of a circuit breaker are used to "load" or "charge" the spring or springs to provide instant or fast mechanical leverage to open or separate the electrical contacts at any moment in which conditions so dictate. This process of mechanically loading the electrical contacts of a circuit breaker may be referred to as "charging." This may be done automatically or manually, depending on the particular circuit breaker. Automatic charging may be done through the use of an associated electric motor to rotate a ratchet and pawl configuration to mechanically load a spring that may be used to quickly separate or "open" the electrical contacts when desired. The ratchet may be implemented as a rotating piece with teeth positioned at least partially around an edge, and the pawl as a lever tangential to the rotating ratchet with one end resting on a tooth of the ratchet. The electric motor can rotate the ratchet in one direction and the pawl slides over each tooth, one at a time, and locks into the next tooth to mechanically load a spring mechanically connected to the rotating ratchet and used to quickly separate the electrical contacts when desired. In manual embodiments, a manual lever is used in place of the electric motor to rotate the ratchet and allow the pawl to slide one tooth at a time until the appropriate mechanical load is applied to the spring. Any of a variety of mechanical arrangements may be employed to "charge" the spring or springs of a circuit breaker.

Circuit breakers often generate an electrical arc when the circuit breaker is tripped or opened. These arcs are arrested using various techniques (including confining the arc within a vacuum) to minimize any damage they may cause. Electrical arcing in circuit breakers are a known hazard and risk. The speed in which a breaker opens when a "trip" signal is received may affect potential hazards from such arcing. In most situations, the faster a breaker opens, the better.

As previously discussed, when a circuit breaker remains in a closed state for an extended period of time, the supporting mechanical parts and systems may deteriorate or result in a condition or state in which the circuit breaker will not open as quickly as desired. This may be caused by any number of reasons, such as, for example, oxidation, galling, loss of vacuum, and/or uneven or undesirable lubrication distribution within the mechanical systems and/or parts. This problem is difficult to diagnose because of the inability to easily replicate these conditions when testing the mechanical properties of a circuit breaker. In fact, once a circuit breaker is opened and closed, negative performance issues caused by extended periods of inactivity, such as, for example, galling and inadequate lubrication, are overcome, for the time being, and unable to be detected through conventional circuit breaker testing. Unfortunately, the condition of extended circuit breaker trip inactivity is often overlooked and/or not tested. This may result in inaccurate testing, inadequate maintenance, and increased safety risks.

Referring now to FIGS. 1 through 17, the following implementation of an analyzer, including a circuit breaker analyzer, for performing vibration analysis of the operation of a device, such as, for example, a machine, equipment, motor, generator, furnace, blower, refrigeration unit, washing machine, dryer, vehicle, motorcycle, windmill, airplane, engine, turbine, hoist, jack, compressor, disposal, hard disk drive, computer, actuator, fan, pump, circuit breaker, and virtually any mechanical device. The condition of a mechanical device may be determined by such analysis. An implementation of a vibration analysis system is also provided, as well as methods for performing vibration analysis of the mechanical operation of a device, such as, for example, a circuit breaker. Once again, it should be understood that although an illustrative implementation of the present invention as a circuit breaker analyzer is shown and discussed below in detail, the present invention may be implemented and used in connection with any number of mechanical devices to analyze and possibly diagnose potential mechanical conditions of such devices. In some embodiments such as, for example, those in which the mechanical device is a circuit breaker, such potential mechanical conditions may include a new circuit breaker, a used circuit breaker, a circuit breaker operated in a test position, a circuit breaker operated in a location separate from a switchgear, a circuit breaker with sufficient vacuum seal, and a circuit breaker with a known defect such as a loss of vacuum, and/or a defect in a part, gear, tooth, bearing, spring, hardened material, charging system, lubrication quality and/or lubrication quantity.

FIG. 1 is a block diagram of a vibration analysis system 200 that includes an analyzer 202, such as a circuit breaker analyzer, and a piece of equipment 360 to be analyzed, such as a circuit breaker, as well as alternative implementations that may include a remote or web enabled server 310 and a client 320, which may communicate with the analyzer 202 through a network 300, which may be a wireless, wired, public or private network, or even the Internet.

Generally, the analyzer 202 may be placed adjacent to, in contact with, or coupled to the equipment 360, such as through a coupling 216, so that vibrations may be sensed or detected by the analyzer 202 as the equipment 360 performs one or more mechanical operations. This data may then be analyzed and compared with, in one example, known vibration patterns, i.e., a known good signature, to determine if the equipment 360 is operating correctly, incorrectly, or to possibly diagnose what mechanical part or system needs repair, adjustment or replacement. If a known good vibration signature is aligned and compared with the measured and recorded vibration data, pattern recognition techniques or mathematical comparisons may be performed to determine or diagnose an issue with the mechanical condition or health of the equipment 360. In one implementation, this comparison or analysis is done locally at a processor 206 of the analyzer 202, and in other implementations, the comparison or analysis is done by a remote processor, such as one located at a local or remote server or client, such as the server 310 or the client 320.

The coupling 216 may be any known or available coupling. For example, the analyzer 202, in one embodiment is implemented using a smart device, such as a smartphone, which may be an IPhone, an I Pod, an I Pad, an I OS device, an Android device, Windows Mobile OS device, or a tablet or notebook computing device. Assuming the analyzer 202 is implemented using an IPhone, the coupling 216 may be attached or positioned in or adjacent a back surface of a case for the IPhone. The magnetic coupling 216 may then be attached to a metal or magnetic attractive surface of the equipment 360. In a preferred embodiment, and depending on the equipment 360 being analyzed, the analyzer 202 is positioned at a similar location each time a test or analysis is performed. Similarly, the known good signature signals are taken from this same location, and, in a preferred embodiment, using the same type of coupling so that the vibration detection will be consistent.

In other embodiments, the coupling 216 may be any known or available coupling, such as, for example, a magnet, a strap, a suction cup, a hook and loop fastener, an adhesive, and/or a mechanical coupling. In certain applications and implementations, the analyzer 202 may be held or leaned against a surface such that the user's hand may be thought of as the coupling, or there is not coupling needed. In some embodiments, the coupling 216 may include multiple parts, some of which acting as extension pieces used to position parts of the analyzer 202 (e.g., the accelerometer 212, gyroscope 214, etc.) adjacent the equipment being analyzed 360. For example, in some embodiments, the analyzer 202 may include a laptop or other processor computing device, wherein the accelerometer 212 and/or gyroscope 214 are external with respect to the laptop. In such an embodiment, the accelerometer 212 and/or gyroscope 214 are coupled to the equipment to be analyzed 360, and are connected to the laptop via a wired or wireless coupling.

In other embodiments, the coupling 216 may be a permanent coupling, wherein the analyzer 202 is permanently affixed to the equipment 360. In such embodiments, the analyzer 202 may monitor the equipment 360 until a predetermined operational event has occurred and/or until a predetermined mechanical condition of the equipment 360 is achieved. Upon occurrence of the predetermined operational event or achievement of the predetermined mechanical condition, an alert may be triggered to indicate the same. For example, if the equipment 360 is a vacuum circuit breaker, the analyzer 202 may be permanently attached to the vacuum circuit breaker to monitor the vacuum circuit breaker for loss of its vacuum seal. By leaving the breaker installed or in a test position, the breaker is not removed, which reduces the chance for damage of the breaker due to, for example, handling or removal and insertion. With the breaker in the installed or test position, operational events may be performed on the breaker, and a signature may be recorded (for example, using an acoustic accelerometer) to determine if one or more vacuum interrupters have failed due to a loss of vacuum.

In one embodiment, the analyzer 202 includes the processor 206, a display 204, a force detector, which may be implemented as an accelerometer 212, such as, for example, a three axes accelerometer capable of measuring forces in three axes each normal to the other two axes, a gyroscope 214, and a memory 208, which may be implemented as solid state, optical or magnetic memory, with an internal or remote database 210. In some embodiments, the analyzer 202 may be a single device having the components (e.g., accelerometer 212, processor 206, display 204, gyroscope 214, memory 208, etc.) integrated within a single device. In other embodiments, the analyzer 202 may be modular, having various components capable of being located remote from other components of the analyzer 202. The processor 206 may execute commands or instructions stored at the memory 208 to begin storing the vibrations detected in one or more axes of the accelerometer 212 as the equipment 360 vibrates from one or more operational events. This vibration data may be stored locally, and/or transmitted via the network 300 to another device or processor, such as the server 310. The measured and/or recorded data may then be compared, either locally in one embodiment, or at a remote processor, as described above, with a known good signature. The known good signature may be provided using the same or similar analyzer 202 used to detect one or more vibration data captures from a known good piece of equipment 360 as well, if desired, from the equipment 360 with a known problem. As explained below, the known good signature (or a known bad signature) may, in some embodiments, be included in a profile created for a specific device or, more generally, for the type of device being analyzed.

As mentioned above, the measured and/or recorded data can optionally be used to create a profile specific to the actual device being analyzed or specific to the type of device being analyzed. The profile may be stored locally and/or remotely and, in some embodiments, may include one or more known good signatures and/or one or more known bad signatures for the particular device or type of device being analyzed. The profile may be used or accessed at the time the device is being analyzed, or may be accessed at a later time to analyze previously measured and/or recorded data. Additionally, the profile may be stored so that it may be used in connection with future testing. As such, known good signatures (or known bad signatures) included in a profile may be used to evaluate measured and/or recorded data generated during an analysis as discussed above. It should be appreciated that the profile can be created as the equipment is being analyzed and as the data is being measured and/or recorded, or may be created at some time after the equipment has been analyzed and the data measuring and/or recording has been completed.

The display 204, in one implementation, as well as a user input device, such as a keyboard or other input device not expressly shown in FIG. 1, may be used to allow the user to input and display identifying data about the specific type of equipment 360 so that an appropriate comparison can be made with a stored vibration signal, such as a known good signature (or in some embodiments, a known bad signature), which may be stored locally at the memory 208 or the database 210, or even remotely at a memory/data source 314 of the server 310. The display 204 may be used, along with the gyroscope 214 and the processor 206 to ensure that the analyzer 202 is properly oriented and positioned relative to the equipment 360. The display and user input may be used to start a test for the analyzer 202 to capture the vibration data from the equipment 360. In some implementations, the display 204 may also function as the user input device.

The client 320 may be a local or remote client, such as a customer client inquiring through the network 300, which in one implementation may be the Internet, to inquire or view stored tests of the equipment 360. The server 310, in one implementation, may store historical data or test results in the memory/data source 314, while in other implementations the test results are stored at the memory 208 of the analyzer 202. The server 310 will preferably include a web or other user interface 316 so the client 320 may interface with and query a processor 312 to provide requested data of the memory/data source 314.

Figure 2:
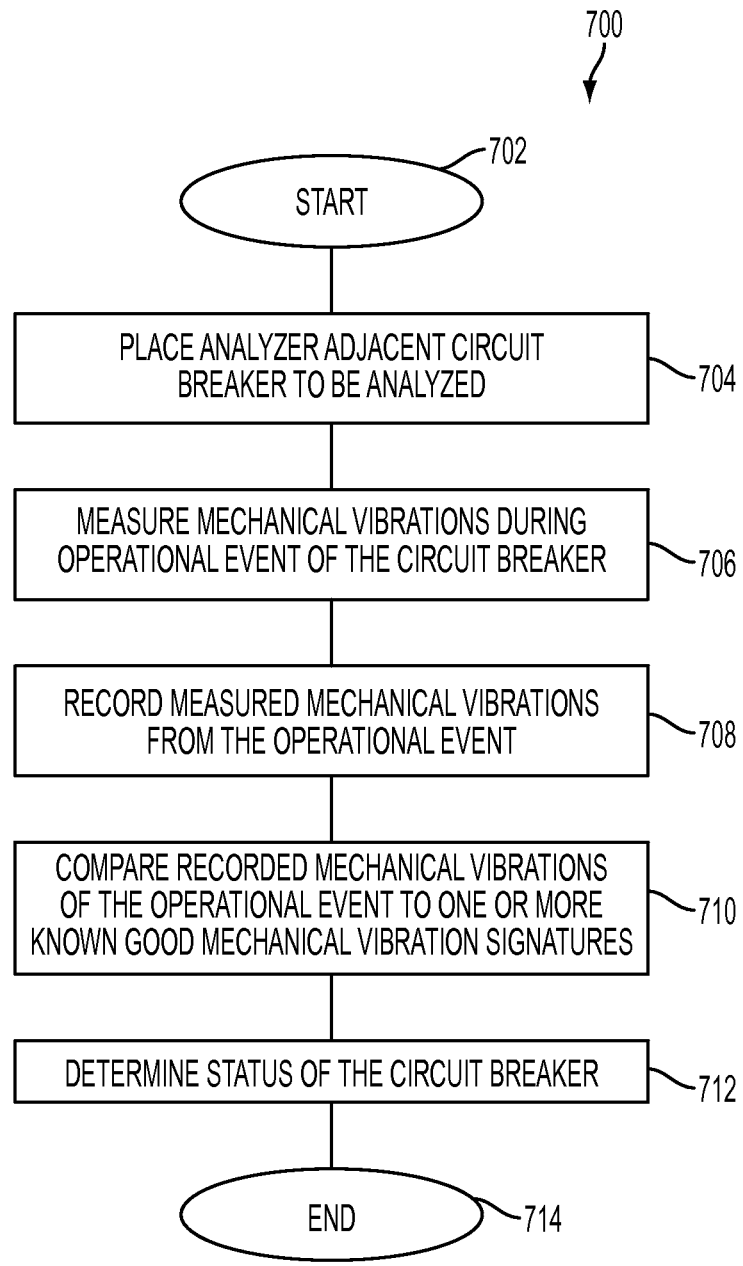
FIG. 2 is a flow chart of a process for performing vibration analysis of the operation, such as one or more operational events, of a circuit breaker to analyze the mechanical condition of the circuit breaker.

FIG. 2 is a flow chart 700 of a process for performing vibration analysis of the operation, such as one or more operational events, of a circuit breaker to analyze the mechanical condition of the circuit breaker. The flow chart 700 begins at 702 and proceeds to block 704 where the analyzer is coupled to or placed adjacent a surface or location of the circuit breaker to be analyzed. In a preferred embodiment, the analyzer is able to determine or detect its orientation, such as through the use of an accelerometer, GPS or other orientation device, to assist with the placement of the analyzer relative to the circuit breaker.

At block 706 the mechanical vibrations are measured by the analyzer, which may be referred to in this embodiment as a circuit breaker analyzer. In some embodiments, the mechanical vibrations are measured during the occurrence of an operational event, whereas, in other embodiments, the mechanical vibrations may be measured during normal operation of the circuit breaker. Proceeding next to block 708, the measured vibrations, which preferably are detected using a force detector, such as an accelerometer, are recorded (which may be referred to as "captured") and stored in memory, such as local memory of the circuit breaker analyzer or remotely using a wireless data connection, or the like.

Proceeding to block 710, the recorded mechanical vibration data for the particular circuit breaker is compared to one or more known or good (or bad) signatures to determine the mechanical condition of the circuit breaker, which may indicate if anything needs to be repaired or replaced. In order to determine the appropriate signature to compare, the user would have previously provided identifying information as to the type of circuit breaker being analyzed. In some implementations, the known good signature is representative of a circuit breaker having sufficient vacuum seal, whereas in other embodiments, a known bad signature is representative of a circuit breaker having a loss of vacuum (i.e., a loss of vacuum seal).

At block 712, the status of the circuit breaker is determined, such as a good, bad, needs repair, needs new part, needs to be retested, or indeterminate, and the user may be notified. The notification may be through email, text, SMS, database, alarm, or any desired medium. The process 700 ends at 714.

Figure 3:
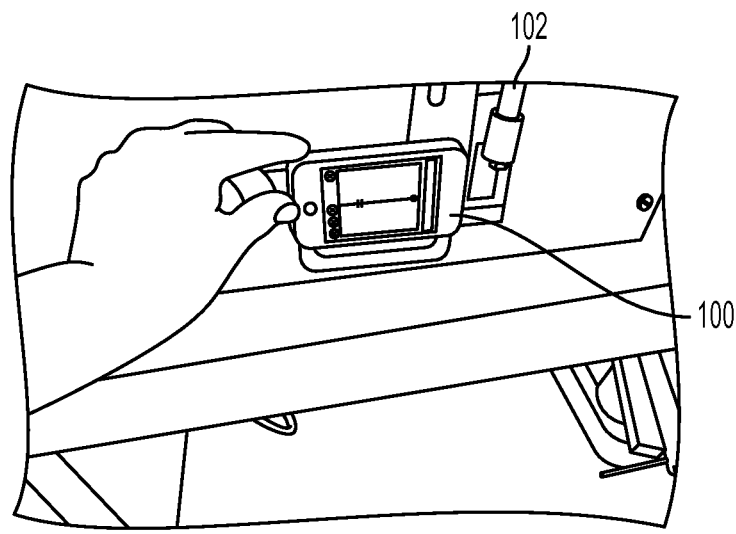
FIG. 3 is a top, perspective view of an analyzer, such as a circuit breaker analyzer, implemented as a smartphone and positioned adjacent a device, such as a circuit breaker, that will have mechanical vibrations measured during an operational event.

FIG. 3 is a top, perspective view of an analyzer, such as a circuit breaker analyzer 100, implemented as a smartphone and positioned adjacent a device, such as a circuit breaker 102, that is to have mechanical vibrations measured during an operational event. The circuit breaker analyzer 100 is preferably oriented a particular way, and placed against a surface of the circuit breaker 102 using a coupling on the back of the smartphone, such as a magnet, to ensure a consistent reading. A display can be seen in FIG. 3 with a graph of forces of the vibrations detected along one or more of the axes.

Figure 4:
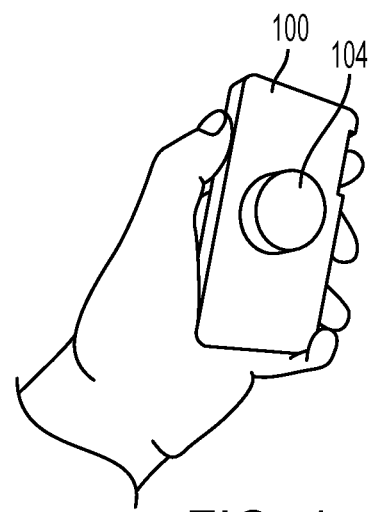
FIG. 4 is a top, perspective view of a connecter, such as a magnet, of the circuit breaker analyzer.

FIG. 4 is a top, perspective view of a connecter or coupling, such as a magnet 104, of the circuit breaker analyzer 100. The magnet 104 is shown positioned on the back of the case of the smartphone, which is shown implemented as an IPhone.

Figure 5A:
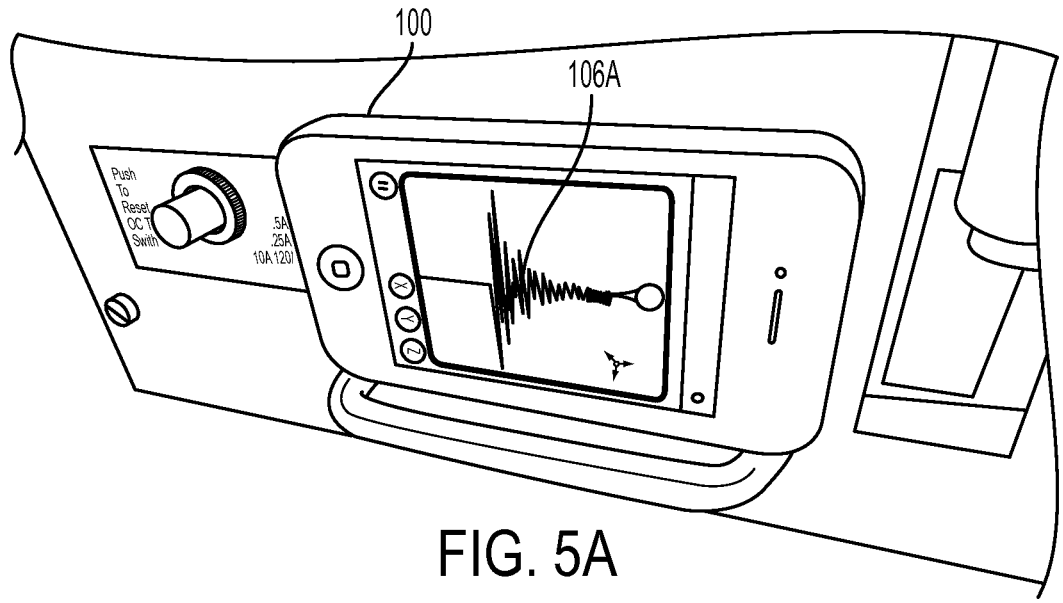
FIGS. 5A, 5B, and 5C are top, perspective views of the circuit breaker analyzer positioned adjacent a surface of a circuit breaker showing mechanical vibrations of the circuit breaker being recorded during operational event(s) that include the opening, charging and closing of the circuit breaker.
Figure 5B:
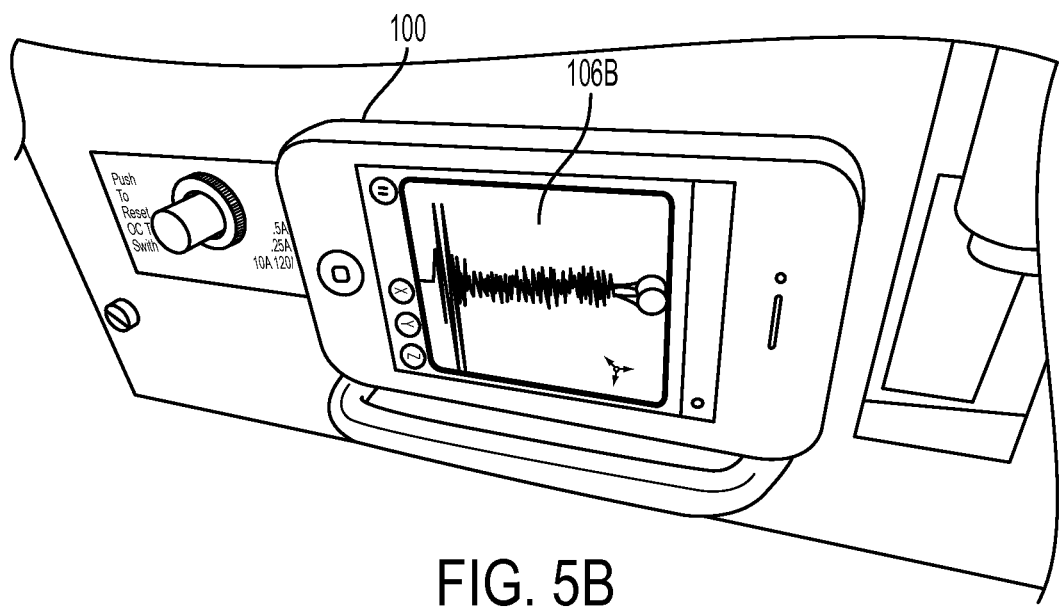
Figure 5C:
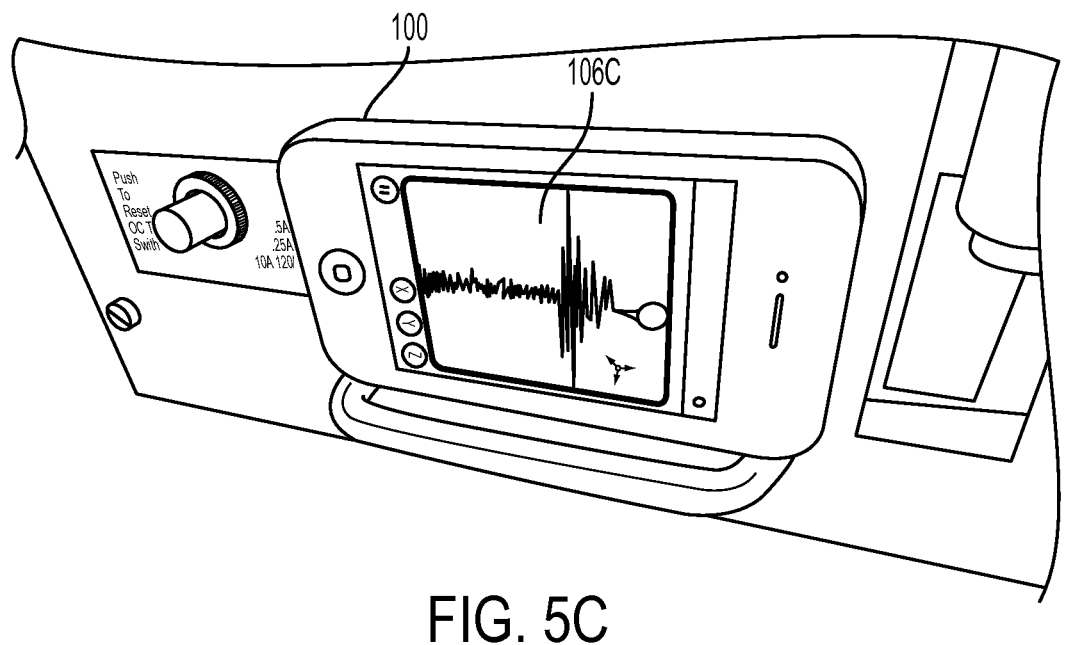

FIGS. 5A, 5B, and 5C are top, perspective views of the circuit breaker analyzer 100 positioned adjacent a surface of the circuit breaker 102 with mechanical vibrations of the circuit breaker being recorded during operational events of the circuit breaker 102 that include the opening, charging and closing of the circuit breaker 102. The three operational events include the opening or tripping of the circuit breaker contacts (shown in FIG. 5A), the mechanical charging of a spring using a ratchet with teeth so that the circuit breaker contacts may quickly open when tripped again (shown in FIG. 5B), and the closing of the circuit breaker contacts (shown in FIG. 5C). Of course, the present invention is in no way limited to these operational events or to the measurement of mechanical operations of a circuit breaker.

Figure 6:
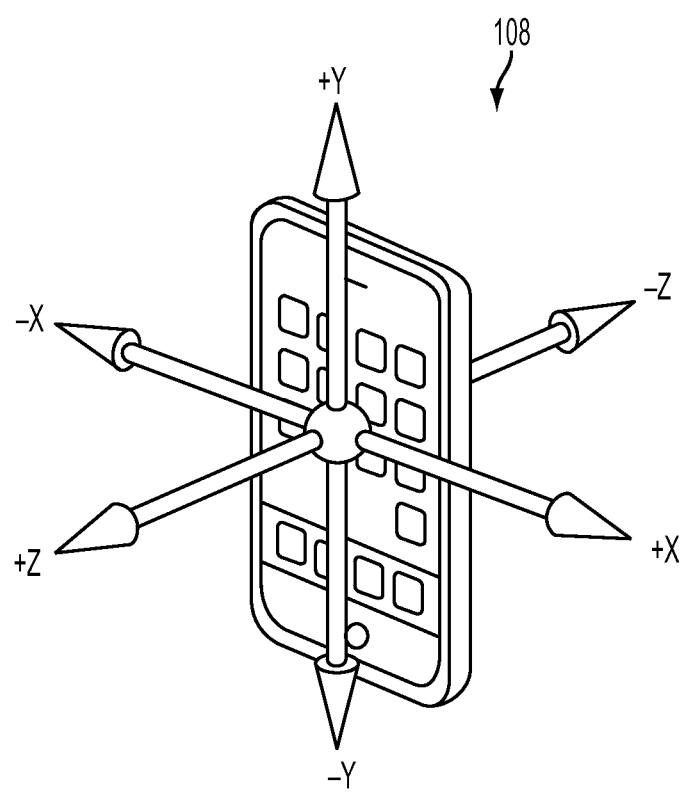
FIG. 6 is a representation that illustrates the analyzer implemented with a three-axes accelerometer (x, y, and z axes as illustrated) to measure mechanical vibrations or forces along these three axes.

FIG. 6 is a representation that illustrates the analyzer implemented with a three-axes accelerometer 108 (x, y, and z axes as illustrated) to measure mechanical vibrations or forces along these three axes. In one embodiment, the accelerometer makes 100 or fewer readings a second (or 100 Hz). In other embodiments, the accelerometer measures forces at a rate of about 200 hertz or less, while in other embodiments, the accelerometer measures forces at a rate of about 400 hertz or less. This may include, in one embodiment, readings in all three axes, or fewer axes. In some embodiments, the accelerometer may be an acoustic accelerometer, where the vibration signals are acoustically acquired. It should be apparent to one of ordinary skill in the art that accelerometers come in many types and operate in different manners, such as capacitive, piezoelectric, piezoresistive, magnetoresistive, heat transfer, micro-electro-mechanical, mechanical, and acoustic accelerometers, with any number of accelerometers suitable for use as described herein.

FIGS. 7A, 7B, and 7C comprise a data table that illustrates exemplary data measurements taken by the analyzer of mechanical vibrations produced by the circuit breaker during an operational event(s) using an accelerometer or force detector that can measure mechanical vibration forces along three axes. The time is shown in the second column of each of the three groupings of data, while corresponding force readings or measurements of the x, y, and z axes are shown for each time period.

Figure 8:
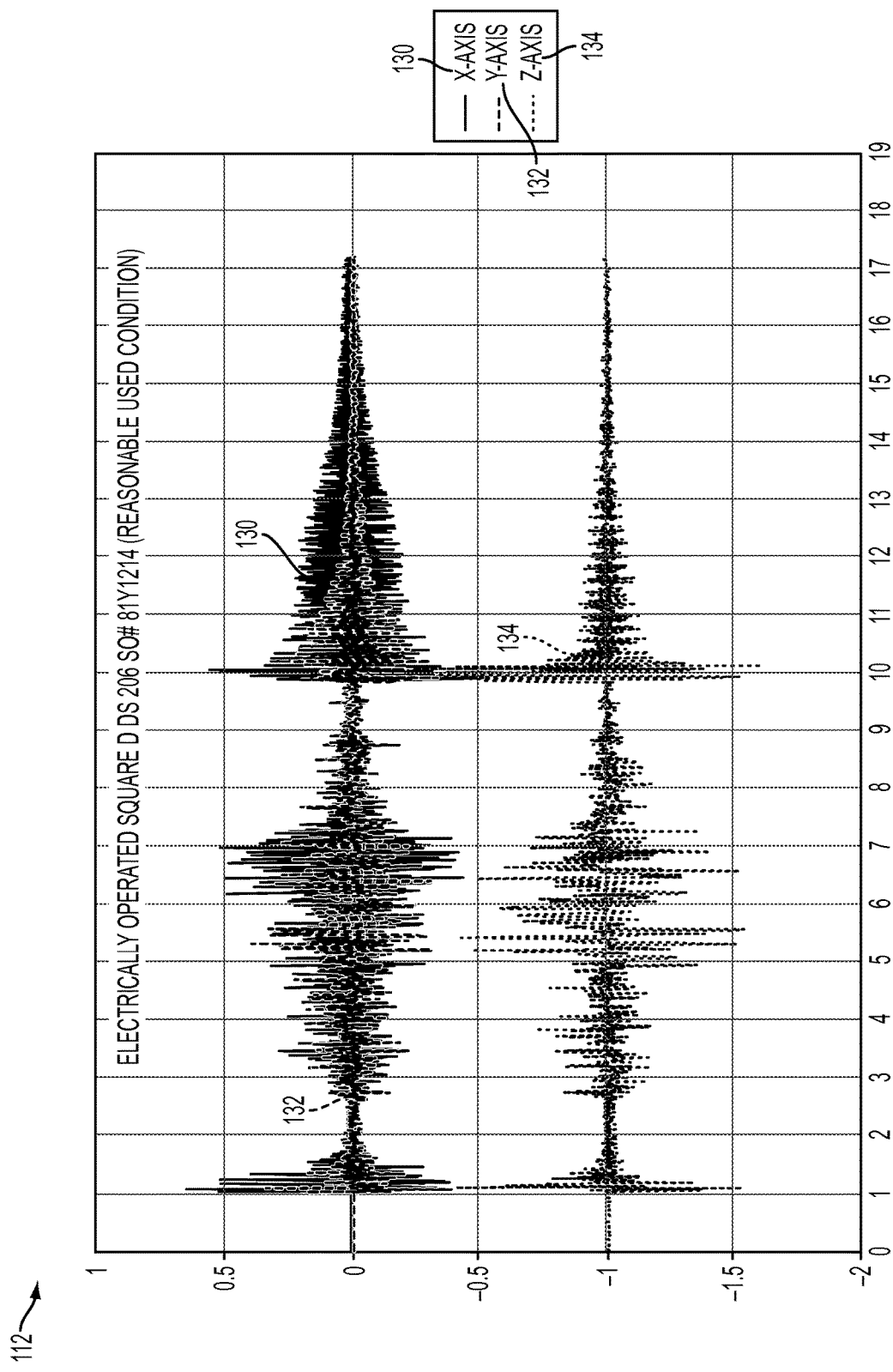
FIG. 8 is a graphical illustration of actual measured mechanical vibrations during three operational events of the circuit breaker showing the x-axis forces centered on the "0" line, the y-axis forces centered on the "0" line, and the z-axis forces centered on the "−1" line.

FIG. 8 is a graphical illustration 112 of actual measured mechanical vibrations during three operational events of the circuit breaker discussed above and showing the x-axis forces 130 centered on the "0" line, the y-axis forces 132 centered on the "0" line along with the x-axis forces 130, and the z-axis forces 134 centered on the "−1" line. In this illustration, higher and lower amplitude vibrations generally appear to occur at or near the same time for all three axes in many cases. This however, may not always be the case depending on the particular device and mechanical vibrations being measured.

Figure 9:
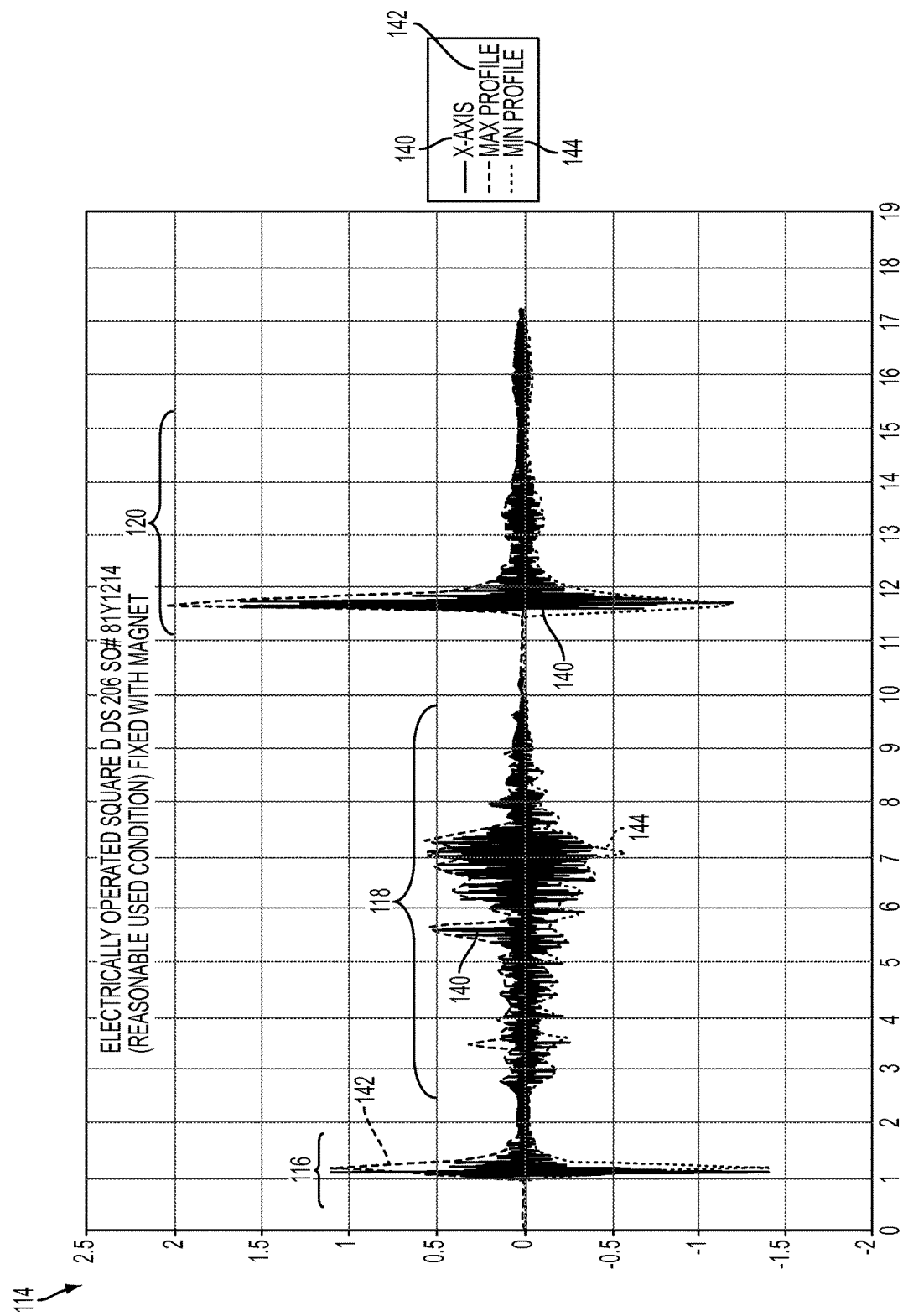
FIG. 9 is a graphical illustration of a comparison of measured mechanical vibrations along the x-axis of actual measured mechanical vibration data during three operational events of the circuit breaker, with the mechanical vibration data of a known good signature maximums and minimums (which may be referred to as an "envelope") that is aligned and superimposed over the actual data to determine if the actual measured mechanical vibration data is an acceptable match with the known good signature vibration.

FIG. 9 is a graphical illustration 114 of a comparison of measured mechanical vibrations or forces 140 along the x-axis of actual measured mechanical vibration data during three operational events of the circuit breaker, with the mechanical vibration data of a known good signature maximums 142 and minimums 144 (which may be referred to as an "envelope") that is aligned and superimposed over the actual data 140 to determine if the actual measured mechanical vibration data is an acceptable match with the known good signature vibration. In some cases, this comparison may be done manually or with human intervention. In other cases, an algorithm or pattern recognition routine is used to determine whether the data 140 is within acceptable limits of the known good signature.

The three operational events of the circuit breaker that are illustrated are as previously discussed. The first operational event is the opening or tripping 116 of the circuit breaker contacts, the second operational event is the mechanical charging 118 of a spring using a ratchet with teeth so that the circuit breaker contacts may quickly open when tripped again, and the third operational event is the closing 120 of the circuit breaker contacts. These unique vibration readings for such operational events may be compared and used to diagnose the mechanical condition of the circuit breaker, in this example.

Figure 10:
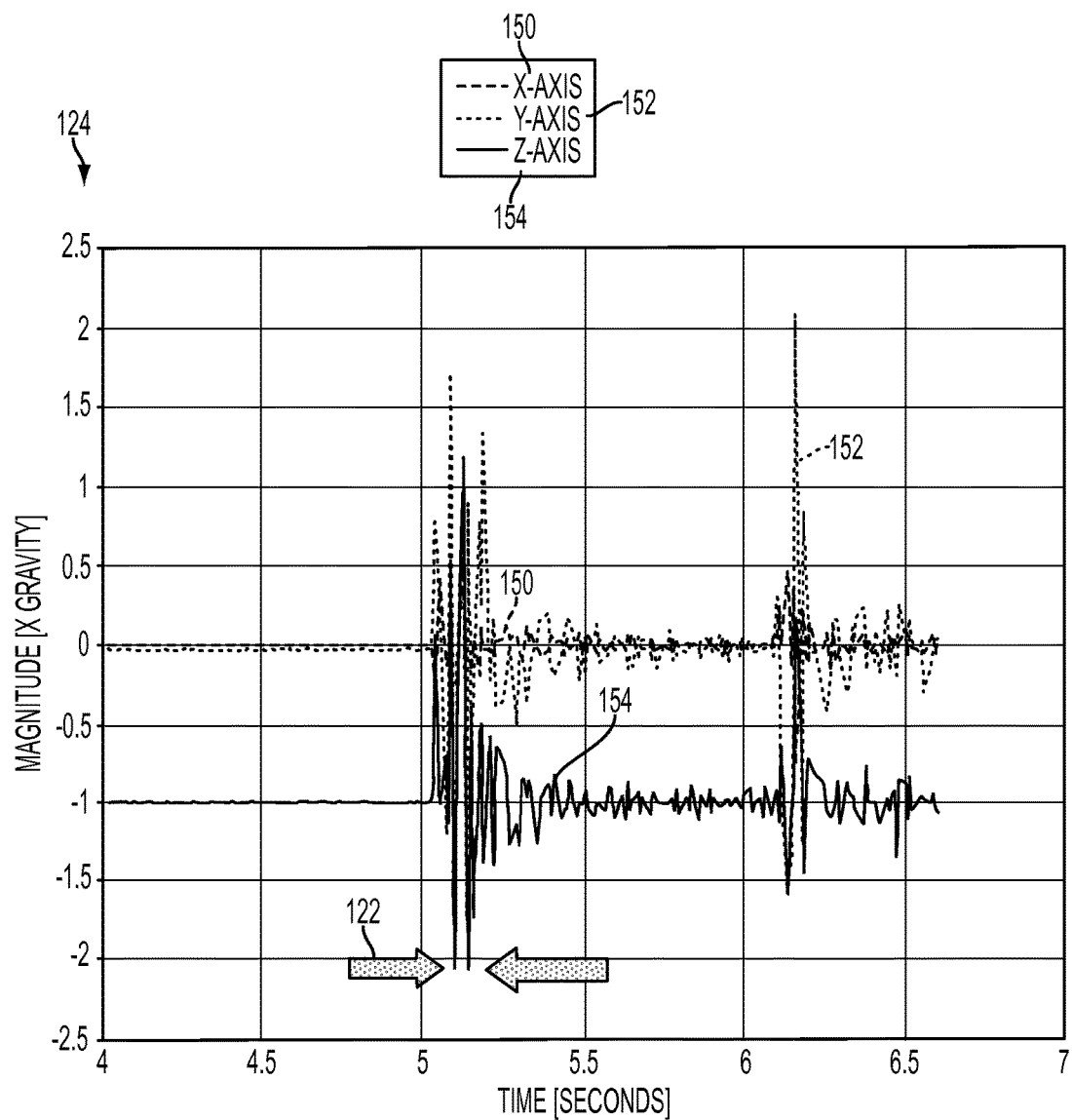
FIG. 10 is a graphical illustration, similar to FIG. 8, of actual measured mechanical vibrations during three operational events of the circuit breaker along three-axes, and highlighting a particular mechanical vibration characteristic of the first operational event for this circuit breaker that may be visually verified to determine if a known, good characteristic or signature is present, which in this case is the duration or time between the two peaks generated by the mechanical vibrations from the opening or "trip" of the circuit breaker.

FIG. 10 is a graphical illustration 124, similar to FIG. 8, of actual measured mechanical vibrations during the three operational events of the circuit breaker just described along three-axes, and highlighting a particular mechanical vibration characteristic of the first operational event for this circuit breaker that may be visually verified to determine if a known, good characteristic or signature is present, which in this case is the duration or time between the two peaks generated by the mechanical vibrations from the opening or "trip" of the circuit breaker. The double peaks 122 are characteristic vibration for the mechanical operation of this particular circuit breaker, and the distance between these peaks may provide information as to the mechanical health, or even the safety of such a circuit breaker.

FIGS. 11A, 11B, 11C, 11D, 11E, 11F, 11G, 11H, 11I, 11J and 11K are various circuit breaker analyzer 202 user inputs and interfaces shown implemented on a smartphone according to certain aspects and implementations. User interface 164 alerts the user to confirm authority to test this particular circuit breaker, while user interface 166 again reinforces to the user that safety procedures must be followed. User interface 168 provides status indication of the breaker and confirmation that the circuit breaker, in this example, will be taken off line. In user interface 170, pre-identified or profiled circuit breakers are selected, or at user interface 172 and/or 174 circuit breaker (or equipment) identifying data is entered so that correct comparisons can be made and data accurately recorded. In alternative embodiments, a bar code scanner, rf reader or camera may be used to identify a tagged or coded piece of equipment.

Figure 11A:
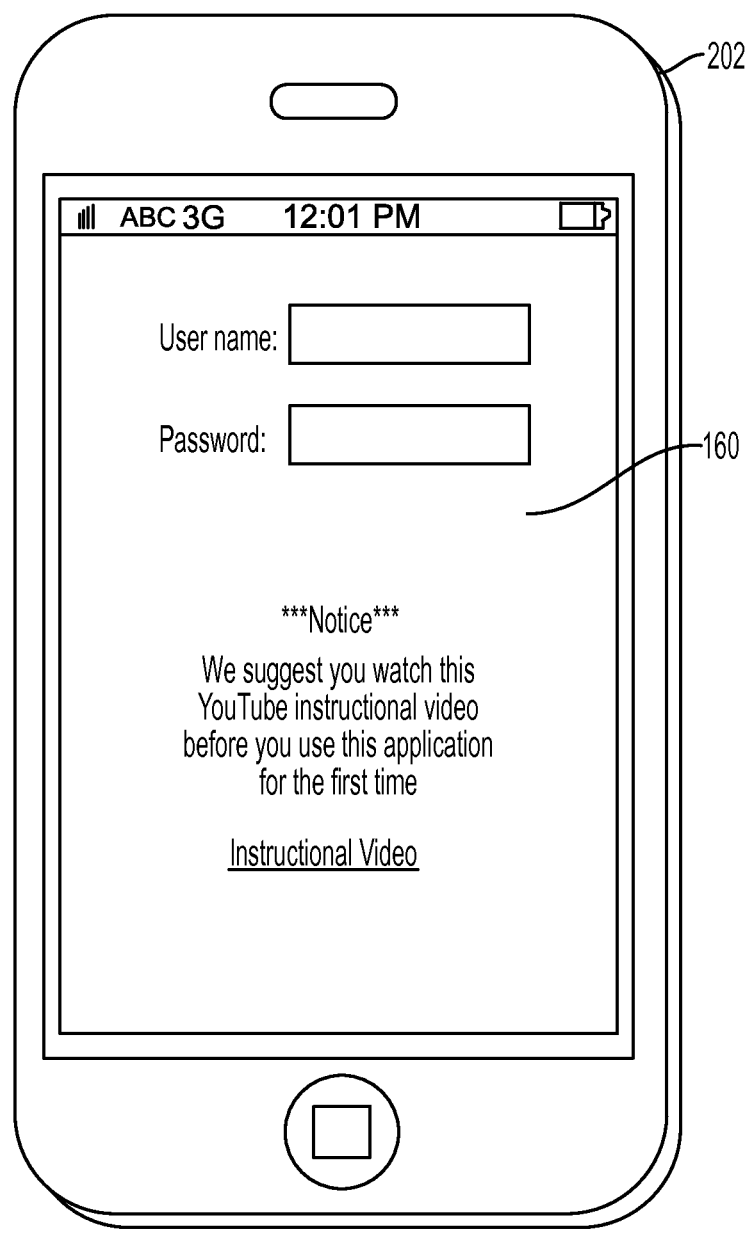
FIGS. 11A, 11B, 11C, 11D, 11E, 11F, 11G, 11H, 11I, 11J and 11K are various circuit breaker analyzer user inputs and interfaces shown implemented on a smartphone according to certain aspects and implementations.
Figure 11B:
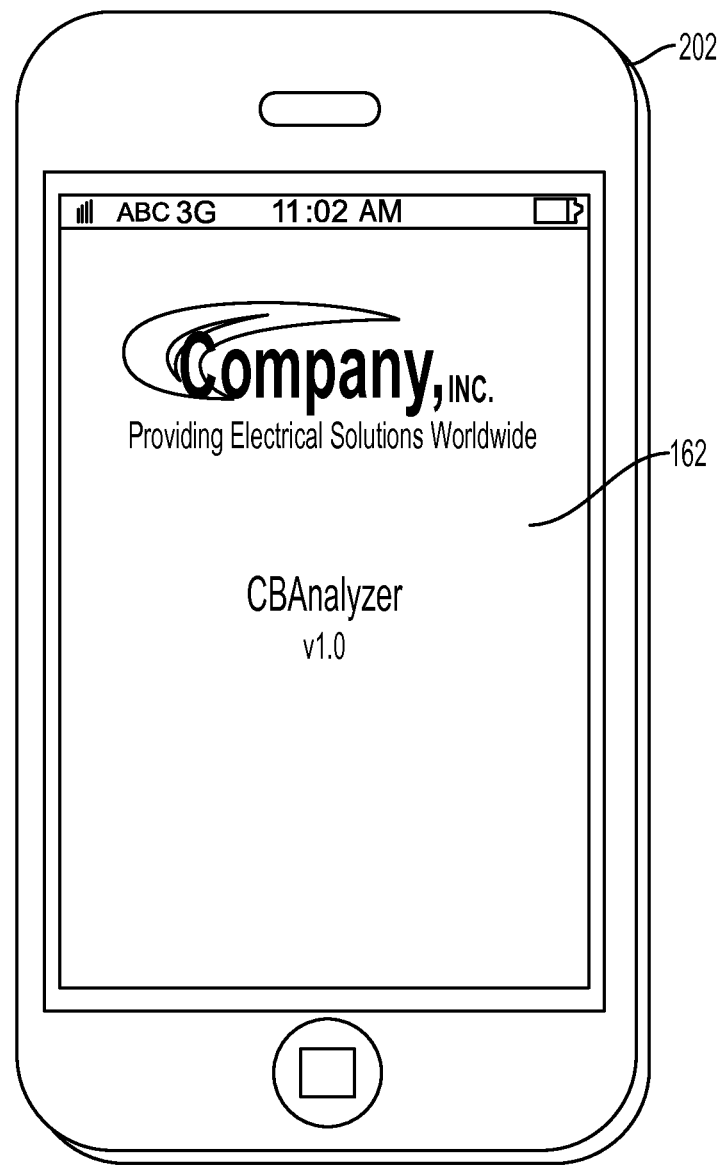
Figure 11C:
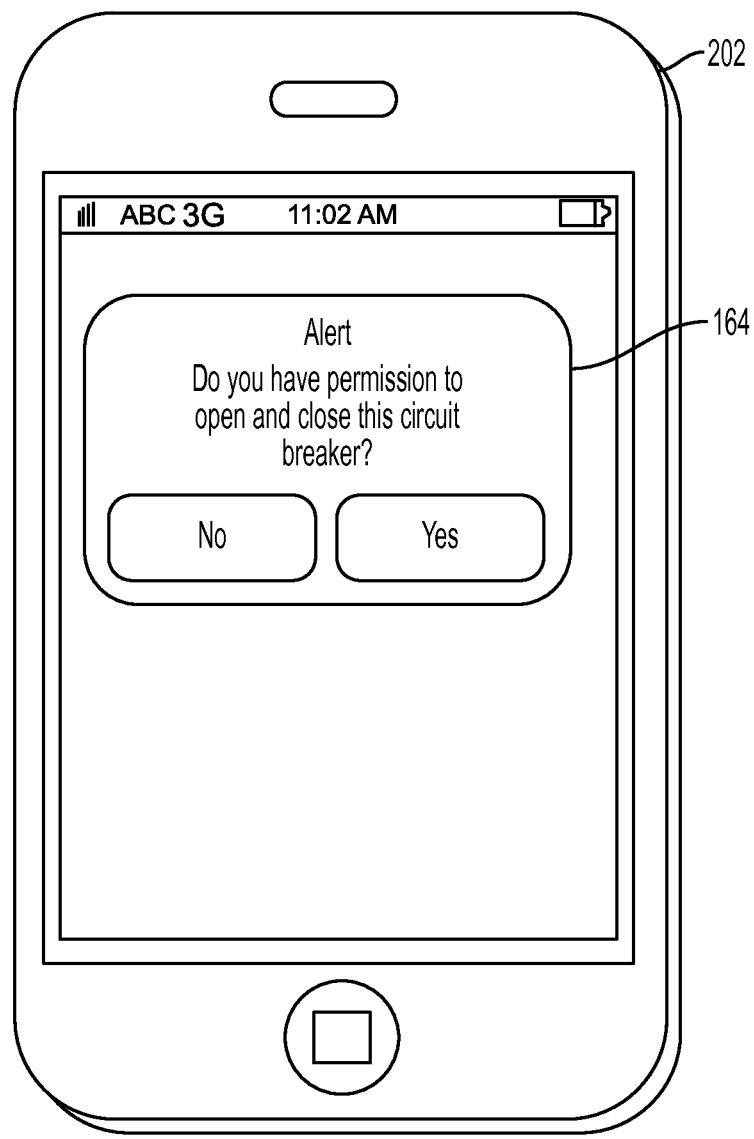
Figure 11D:
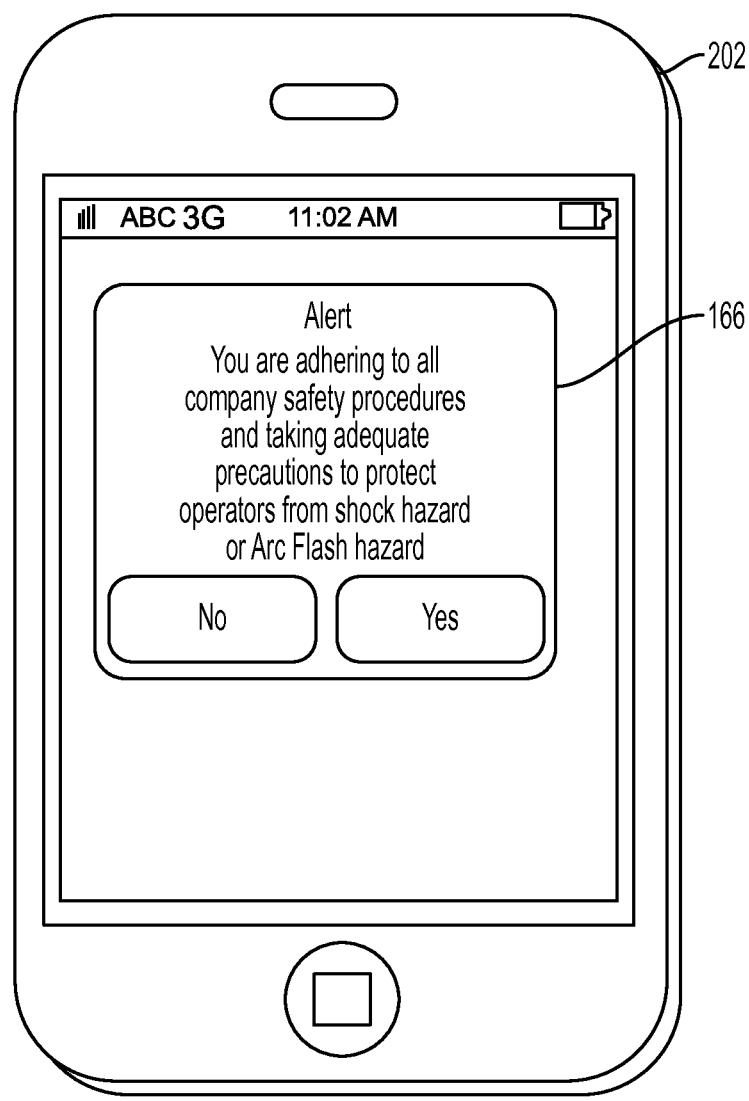
Figure 11E:
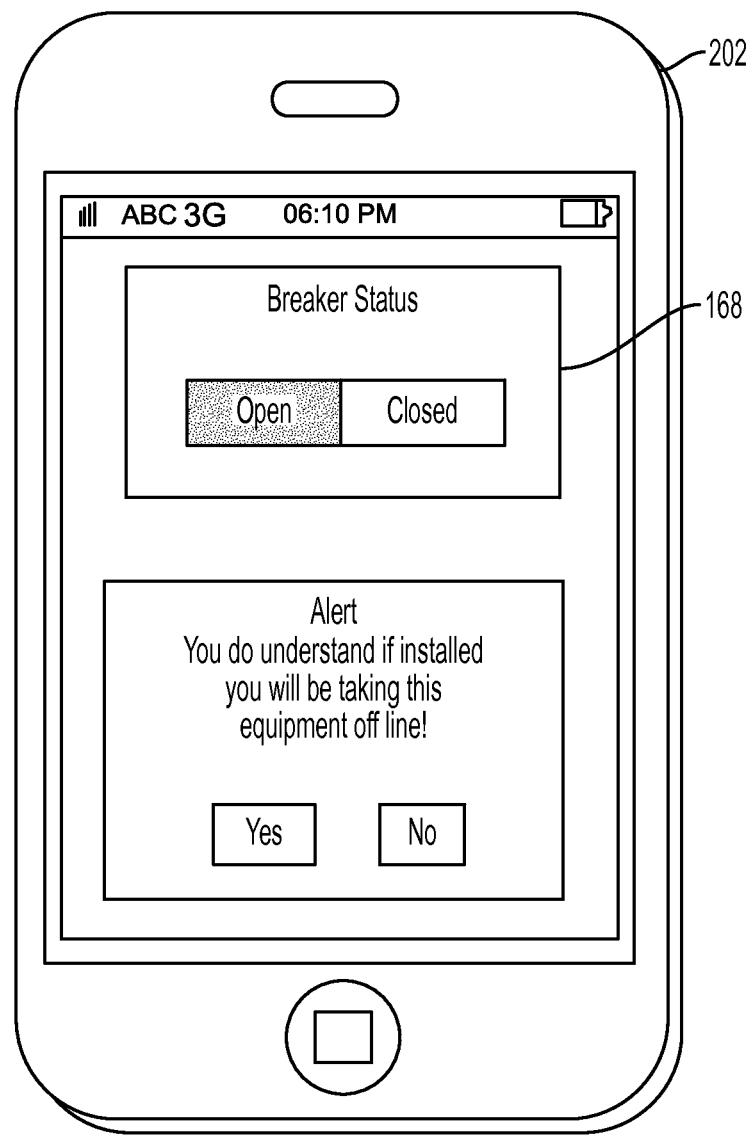
Figure 11F:
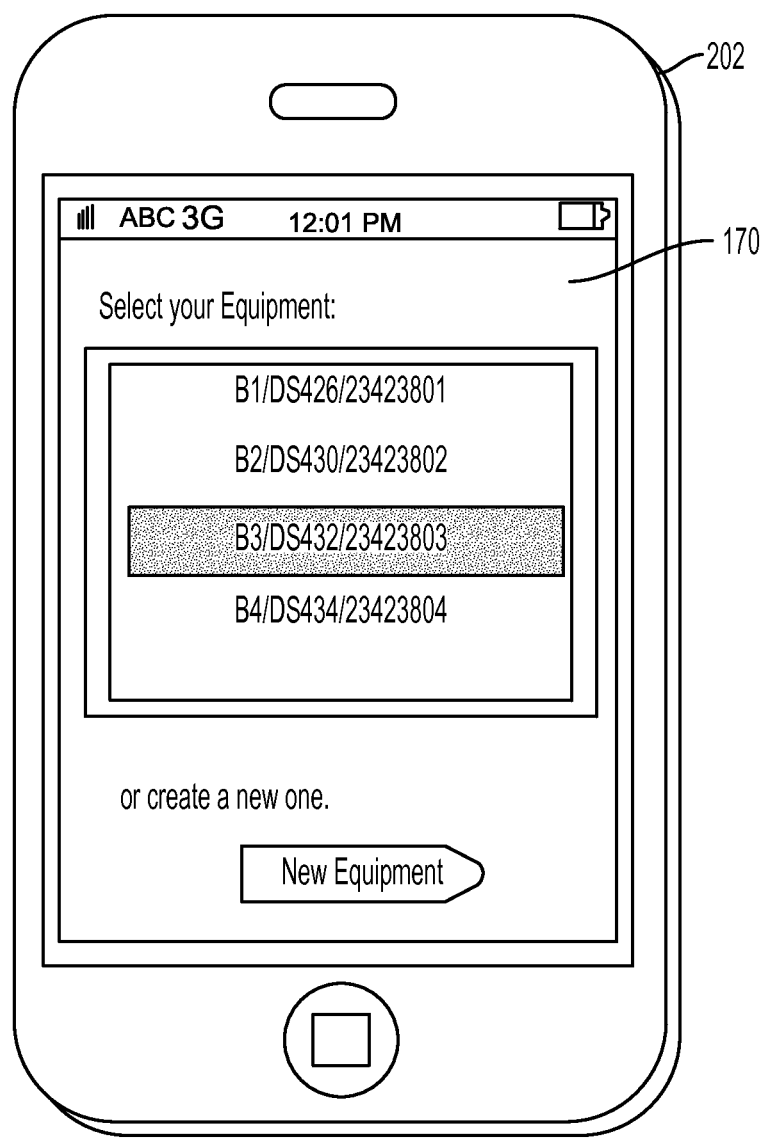
Figure 11G:
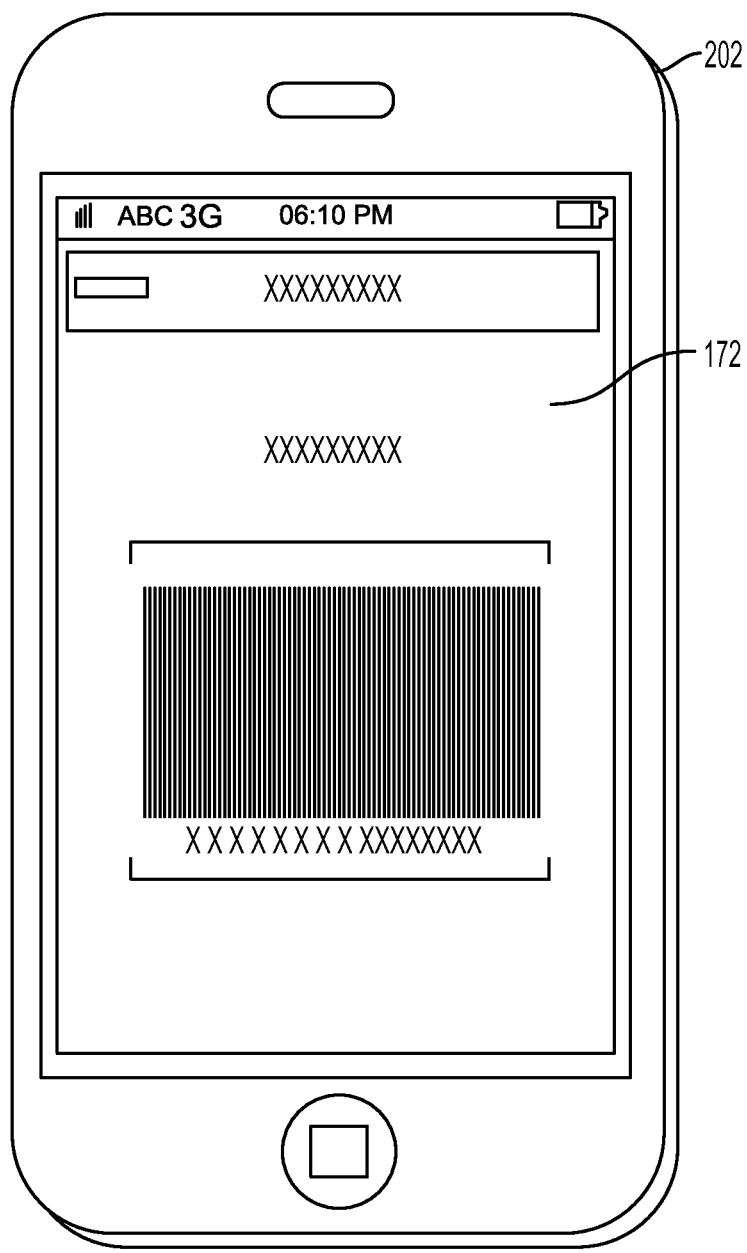
Figure 11H:
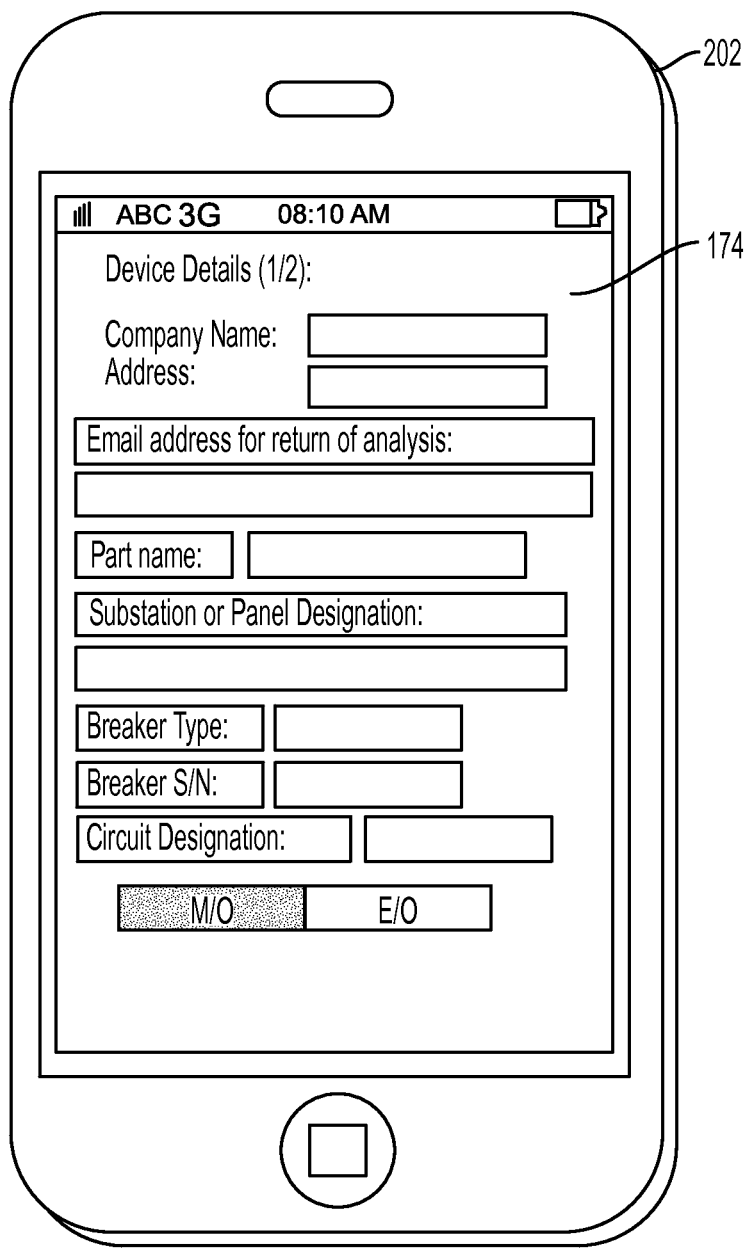
Figure 11I:
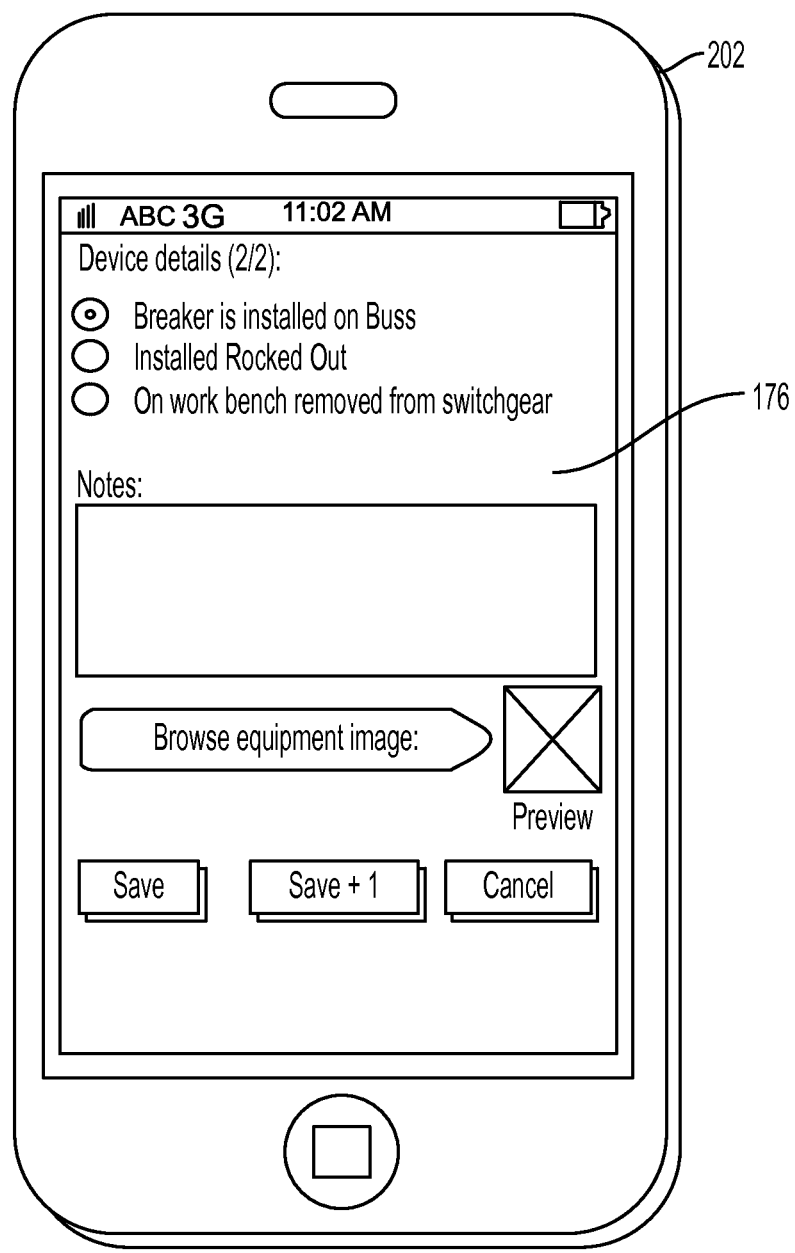
Figure 11J:
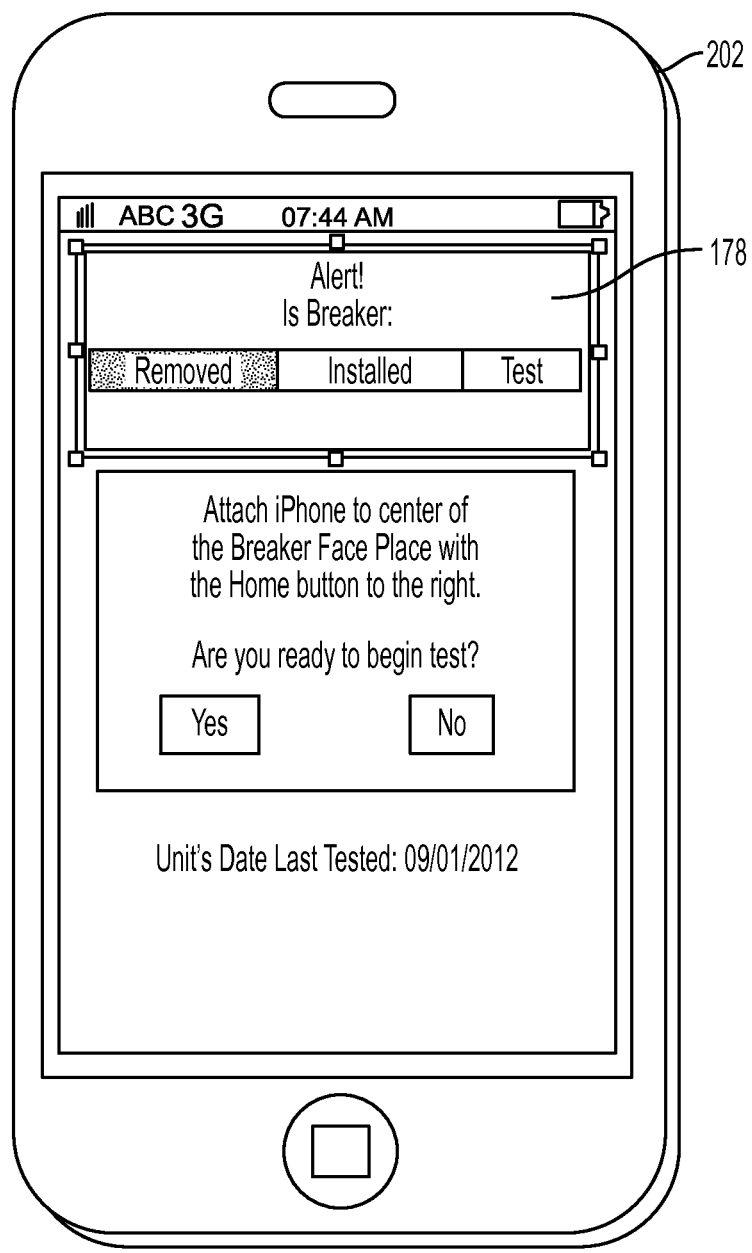
Figure 11K:
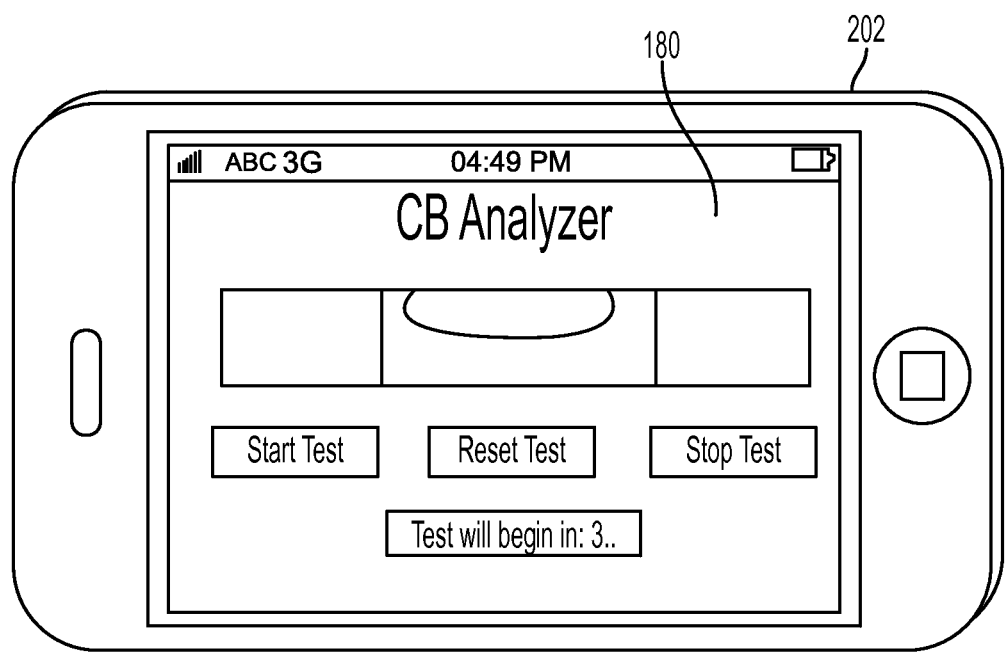

User interface 178 indicates whether the circuit breaker is positioned or stored in the switchgear, housing or elsewhere, which may affect the mechanical vibrations generated, and the user is instructed where to place the circuit breaker analyzer 202 relative to this particular piece of equipment. In FIG. 11K, an orientation detection device is used, such as a gyroscope, to drive an animated level so that the analyzer 202 is properly oriented for the test. The analyzer is coupled to the equipment being tested and the test is run.

Figure 12A:
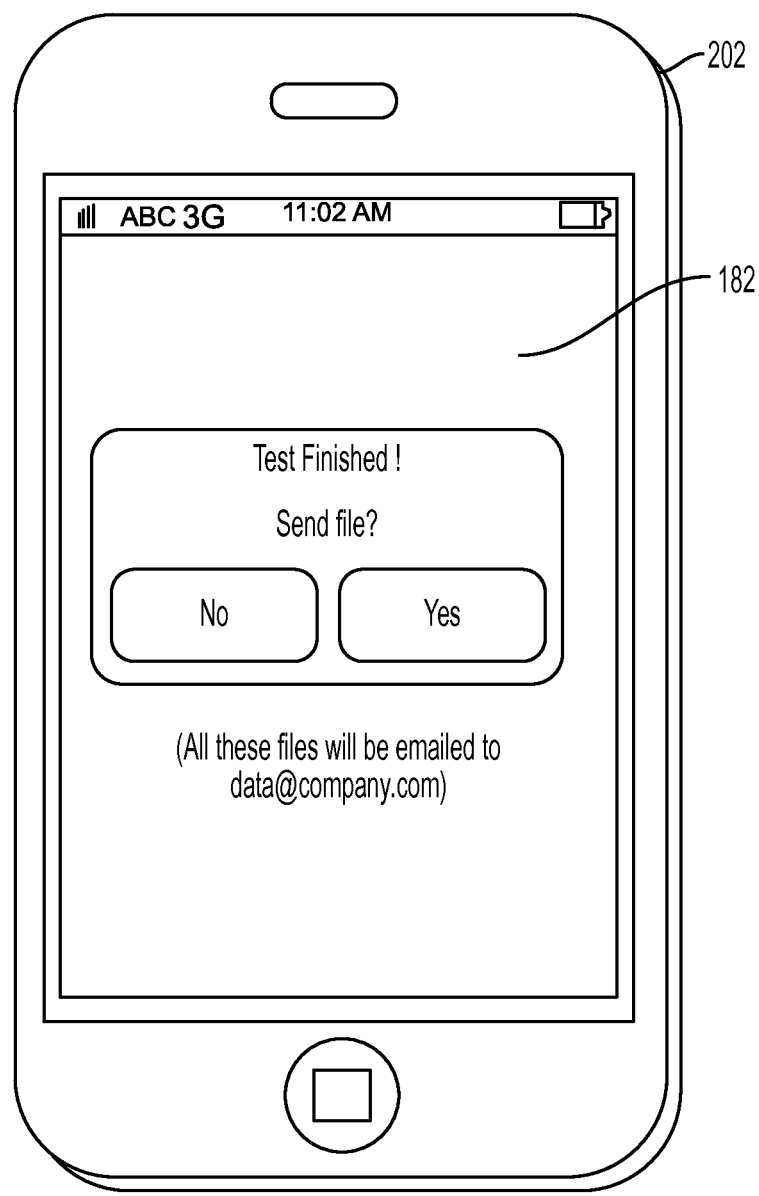
FIGS. 12A and 12B are various circuit breaker analyzer user outputs and interfaces shown implemented on the smartphone.
Figure 12B:
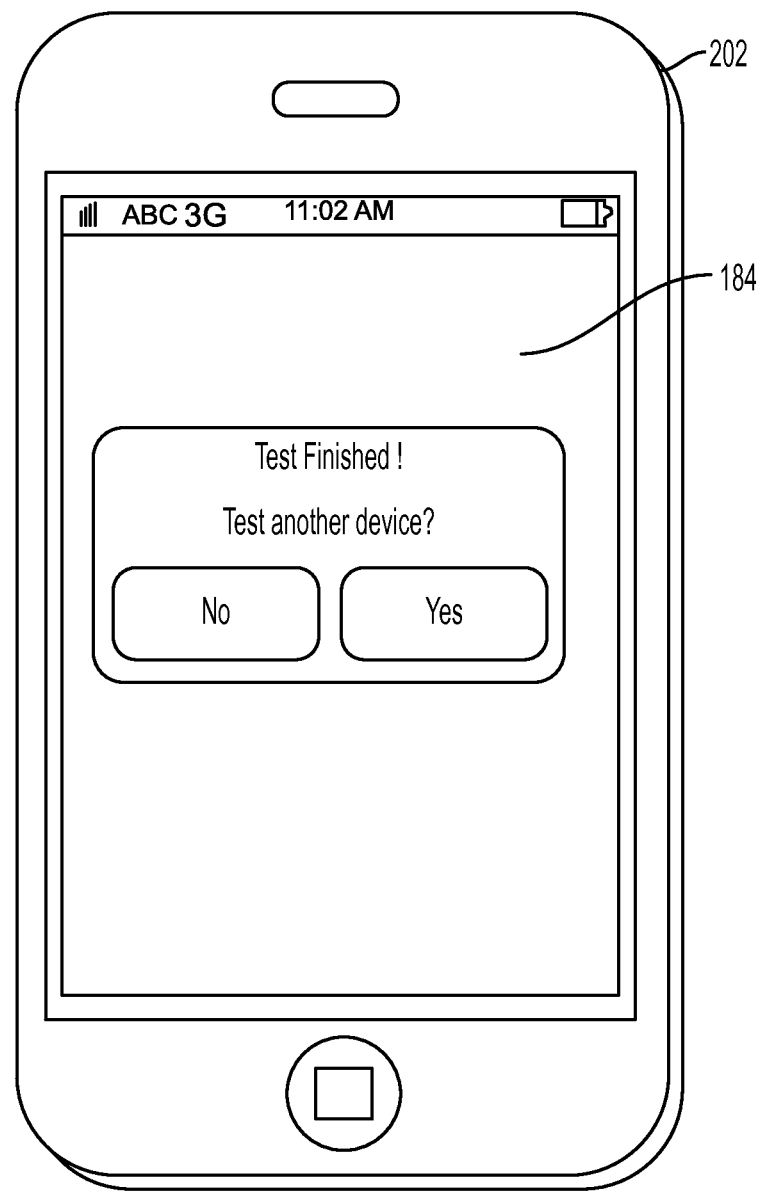
Figure 13A:
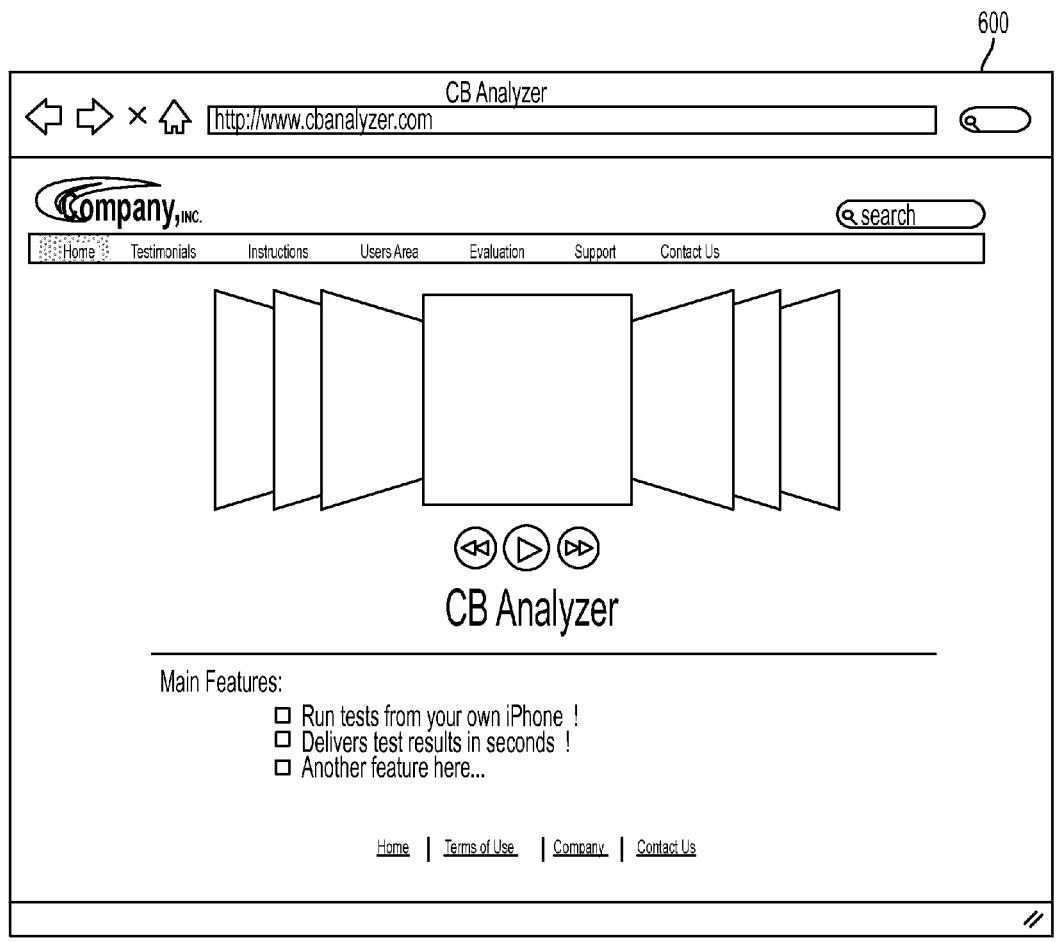
Figure 13E:

FIGS. 12A and 12B are various circuit breaker analyzer user outputs and interfaces shown implemented on the smartphone of the analyzer 202. User output 182 indicates that the test is finished, and queries the user whether the test results should be sent/emailed, assuming such implementation. User interface 184 indicates that the test is complete, and asks the user if another device is to be tested.

FIGS. 13A, 13B, 13C, 13D, and 13E are various circuit breaker analyzer system output, report and user interfaces implemented, in this example, as a web interface 600, where historical results are available and may be chosen through the graphical interface. In a preferred embodiment, these interfaces are implemented at a server, such as the server 310 of FIG. 1. User interfaces 602, 604, 606, and 608 of FIGS. 13B-13E show various data query screens, equipment identification and specification inputs, and user area profile and identification areas.

FIG. 14 is an example electronic test results report implemented as an electronic mail indicating, in this example, that the tested circuit breaker matches a known good signature for this type of circuit breaker. This may include embedded links to the database and additional information that may be accessed through the one or more interfaces illustrated in FIGS. 13A-13E.

Figure 15A:
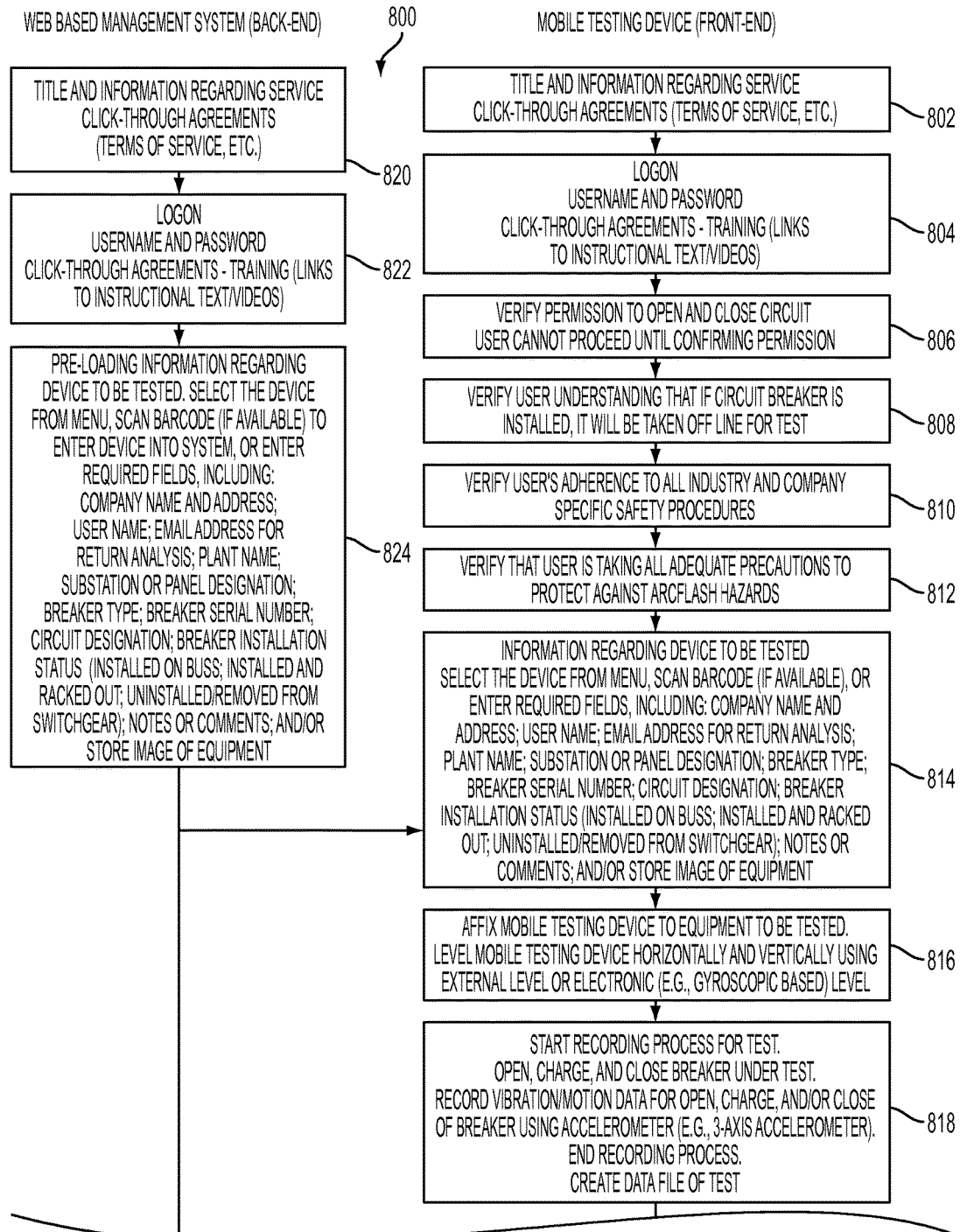
FIGS. 15A and 15B comprise a detailed flow chart of a process for performing vibration analysis of the operation of a circuit breaker to analyze the mechanical condition of the circuit breaker, including alternative implementations that include a web or remote based comparison of measured vibration to a known good signature.
Figure 15B:
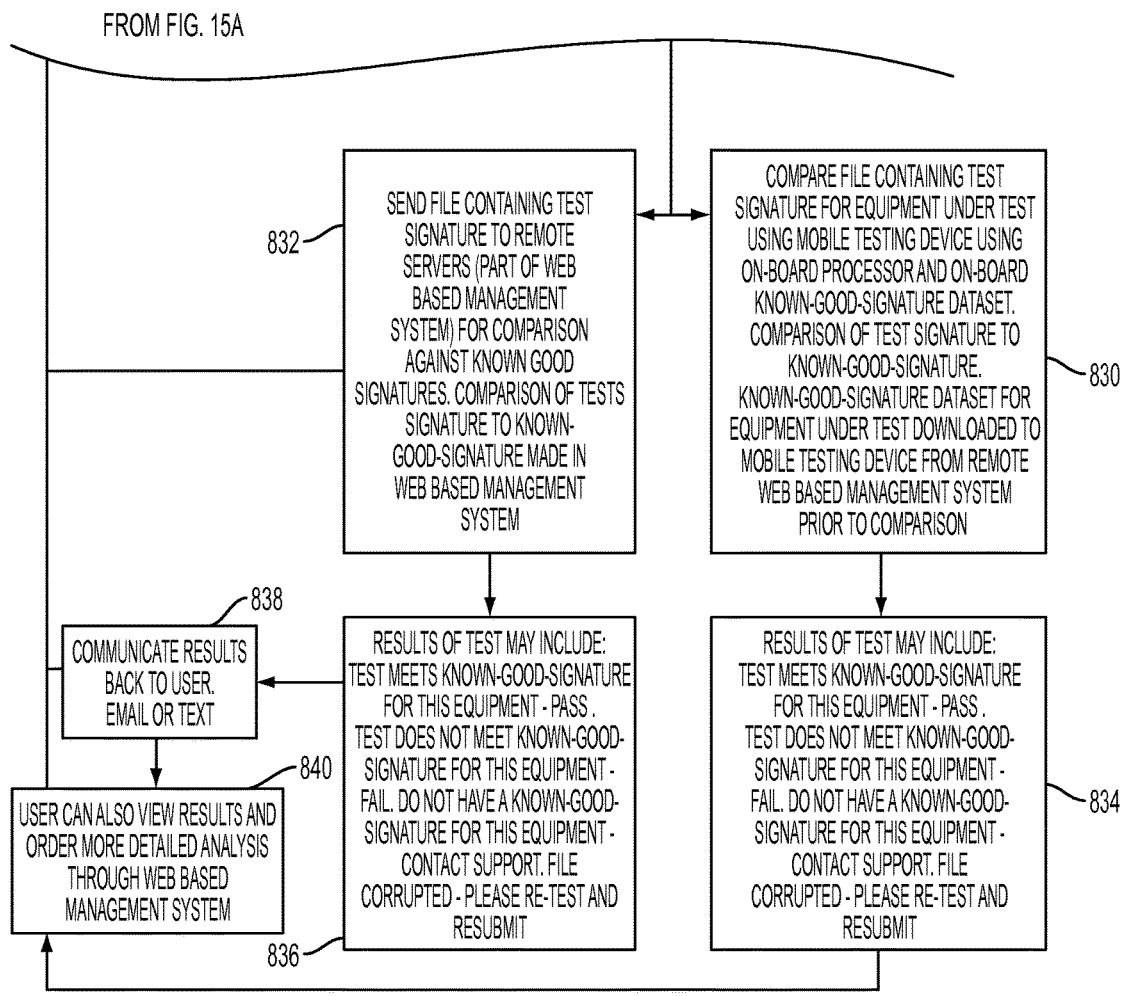

FIGS. 15A and 15B comprise a detailed flow chart 800 of a process for performing vibration analysis of the operation of a circuit breaker to analyze the mechanical condition of the circuit breaker, including implementations that include a web or remote back-end system (see, e.g., blocks 820, 822, and 824) for providing the comparison of measured vibrations to a known good vibration signature. The various implementations, including alternative implementations, are as discussed above and as stated in FIGS. 15A and 15B (see, e.g., blocks 802-812). Generally, in one embodiment the analyzer itself may store the data test results locally, provide the comparison of such data with a known good profile or signature (locally without communication from the web or remote back-end system), and resulting analysis to locally produce output results such as pass, fail or data error (see, e.g., blocks 830 and 834). The output results may be displayed locally or transmitted, such as by email, to a designated location (see, e.g., block 838).

In other implementations, the local or mobile circuit breaker analyzer collects the vibrational data, and identifying data of the equipment being tested (such as the model number of the circuit breaker being tested), and such data is sent or transmitted to a server, such as a back-end, web based server system, where the comparison and analysis are performed. This includes the comparison of known good (or bad) or recognized vibration signatures for the particular model of the piece of equipment being tested. The results of such comparisons are then made available to customers, who may pay for such services using online payments, or other available means. The output results may be emailed to the customer, and may also be preferably stored at the server for historical review on such web based server system.

Figure 16:
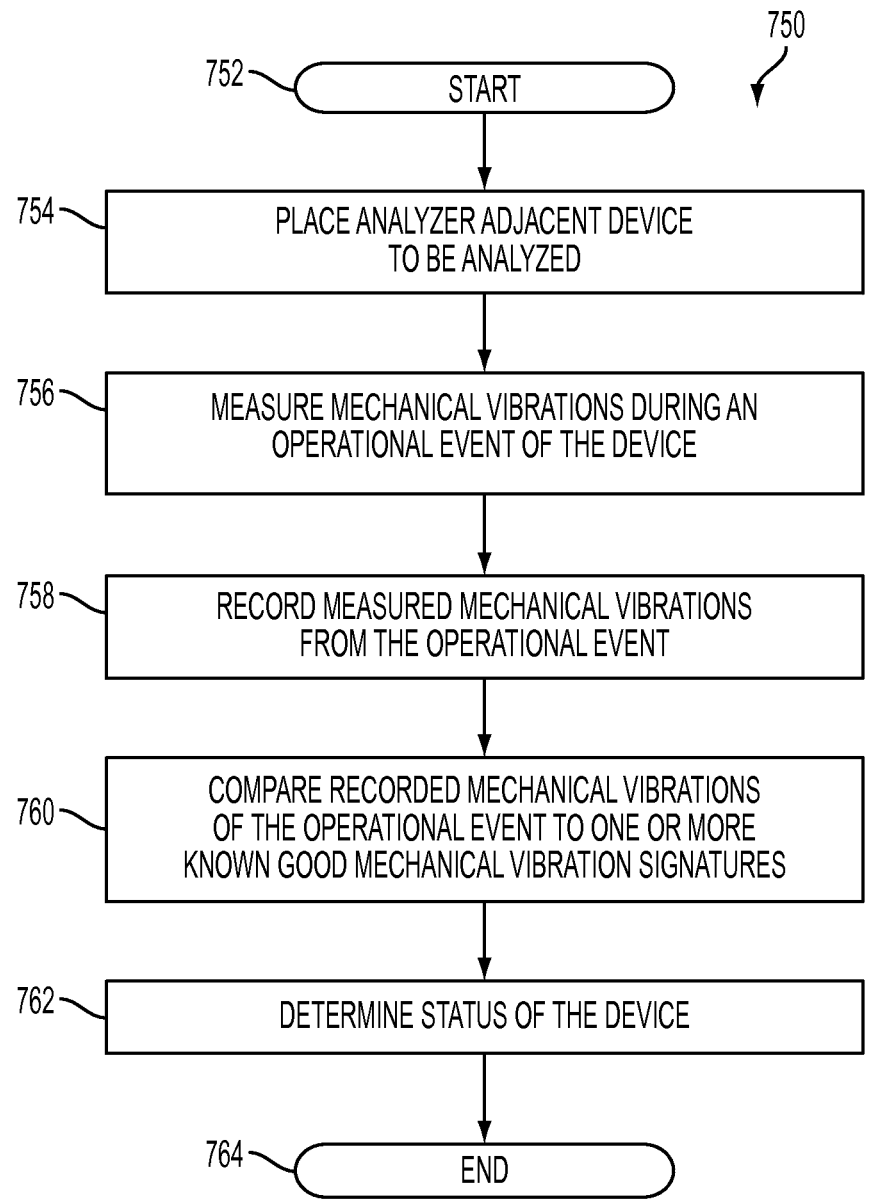
FIG. 16 is a flow chart of a process for performing vibration analysis of the operation, including one or more operational events, of a device to analyze the mechanical condition of the device, which could be any of a variety of devices with mechanical systems.

FIG. 16 is a flow chart 750 of a process for performing vibration analysis of the operation, including one or more operational events, of a device to analyze the mechanical condition of the device, which could be any of a variety of devices with mechanical systems. The flow chart 750 is similar to what was previously described in connection with the flow chart 700 of FIG. 2, except that instead of measuring and recording the mechanical vibrations of a circuit breaker, the analyzer is used to measure the mechanical vibrations of some other mechanical device, such as, for example, a machine, equipment, motor, generator, furnace, blower, refrigeration unit, washing machine, dryer, vehicle, motorcycle, windmill, airplane, engine, turbine, hoist, jack, compressor, disposal, hard disk drive, computer, actuator, fan, pump, rotating machinery, or other mechanical device. The flow chart 750 begins at 752 and proceeds to block 754 where the analyzer is coupled to or placed adjacent a surface or location of the device to be analyzed. In a preferred embodiment, the analyzer is able to determine or detect its orientation, such as through the use of an accelerometer, GPS or other orientation device, to assist with the placement of the analyzer relative to the device.

At block 756 the mechanical vibrations are measured by the analyzer. In some embodiments, the mechanical vibrations are measured during the occurrence of a specific operational event, whereas, in other embodiments, the mechanical vibrations may be measured during normal operation of the device. Proceeding next to block 758, the measured vibrations, which preferably are detected using a force detector, such as an accelerometer, are recorded or captured.

Proceeding to block 760, the recorded mechanical vibration data for the particular device is compared to one or more known or good signatures to determine the mechanical condition of the device, which may indicate if anything needs to be repaired or replaced. In order to determine the appropriate signature to compare, the user would have previously provided identifying information as to the type of device being analyzed.

At block 762, the status of the device is determined, such as a good, bad, needs repair, needs to be retested, or indeterminate, and the user may be notified. The notification may be through email, text, database, alarm or any desired medium. The process 750 ends at 764.

Figure 17:
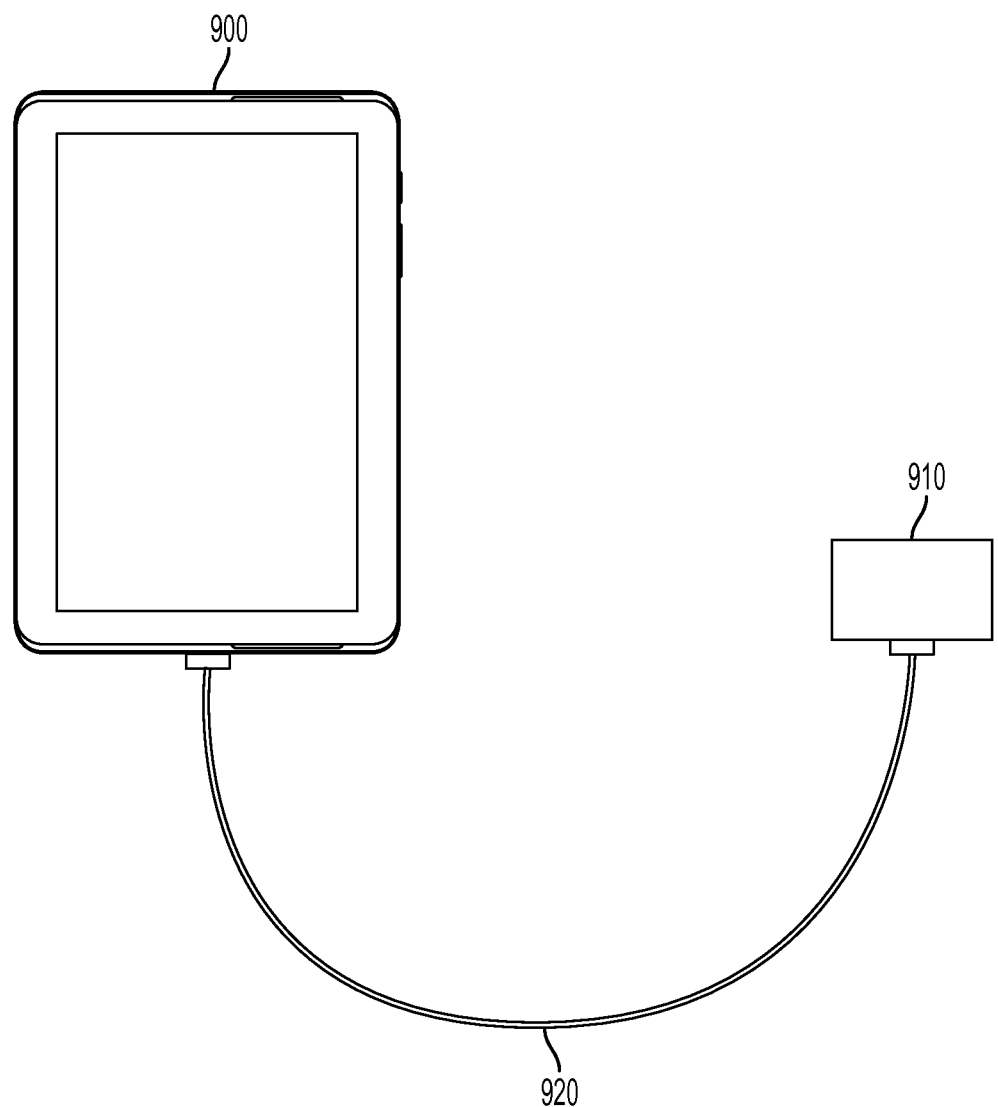
FIG. 17 is a top view of an analyzer, such as a circuit breaker analyzer, implemented as a tablet computer with an external accelerometer device connected thereto.

FIG. 17 is a top view of an analyzer, such as a circuit breaker analyzer, implemented as a tablet computer 900, wherein the accelerometer and/or gyroscope 910 are external with respect to the tablet computer 900. The accelerometer and/or gyroscope 910 is preferably oriented a particular way, and placed against a surface of the apparatus being analyzed using a coupling on the back of the accelerometer and/or gyroscope 910, such as a magnet, to ensure a consistent reading. The accelerometer and/or gyroscope 910 may be connected to the tablet computer 900 by wire 920 or by wireless means.

As discussed herein, there are several embodiments in which the analysis of the equipment can be performed locally by the analyzer without having to maintain a connection with the remote server. Such implementations may be particularly useful for instances in which a connection to the remote server may not be available during testing of the equipment. For example, in some implementations, a user may download known good signatures/profiles for particular circuit breakers (or other equipment being tested) from the remote server prior to testing the equipment. In such embodiments, the user is able to run the test to analyze the circuit breaker locally at the analyzer, without a connection to the remote server. In other embodiments, the test may be performed on the equipment without a connection to the remote server, and known good signatures/profiles are downloaded to the analyzer once a connection is established with the remote server after testing of the equipment. In such embodiments, testing is still performed without a connection to the remote server and analysis is still performed locally at the analyzer, but the known good signatures/profiles are received after the test is run on the equipment, rather than prior to testing of the equipment.

Thus, it is apparent that there has been provided, in accordance with the present disclosure, an analyzer system and method to determine the mechanical condition of a device, such as a circuit breaker (including a vacuum circuit breaker), appliance, machine, equipment, or other mechanical system that satisfies one or more of the advantages set forth above. Although the preferred embodiment has been described in detail, it should be understood that various changes, substitutions, and alterations can be made herein without departing from the scope of the present disclosure as set forth in the claims provided below, even if all of the advantages and benefits identified above are not present. For example, the various embodiments and examples shown in the drawings and descriptions provided herein illustrate that the present invention may be implemented and embodied in numerous different ways that still fall within the scope of the present disclosure, whether expressly shown herein or not. For example, the various elements or components may be combined or integrated in another system or certain features may not be implemented. Also, the techniques, systems, sub-systems, and methods described and illustrated in the preferred embodiment as discrete or separate may be combined or integrated with other systems, designs, techniques, or methods without departing from the scope of the present disclosure. For example, the circuit breaker analyzer may be partially or fully implemented in a smartphone in certain embodiments, and such analyzer may be implemented to analyze a variety of devices, such as those discussed herein. Other examples of changes, substitutions, and alterations are readily ascertainable by one skilled in the art and could be made without departing from the spirit and scope of the present invention.

Furthermore, in some embodiments, a recorded vibration signature may be compared with a known bad signature to determine a specific mechanical condition. For example, a vibration signature recorded from a vacuum circuit breaker could be compared with a known signature that indicates loss of vacuum seal to determine whether the analyzed vacuum circuit breaker has a loss of vacuum.

Additionally, it should be apparent to one of ordinary skill in the art that the disclosed analyzer system and method to determine the mechanical condition of a device may be incorporated in a system or network for continuously monitoring the status or mechanical condition of the device or devices. In such embodiments, an indicator may be provided, or an alert (e.g., SCADA alert) or status report may be generated, to indicate the mechanical condition of the device in real-time or at pre-determined instances, so that a user, system, or network can monitor the status of the device(s) without having to analyze each device on an ad hoc basis.

What is claimed is:

1. A vibration analysis system for performing vibration analysis of operation of a circuit breaker to analyze a mechanical condition of the circuit breaker, the vibration analysis system comprising:
    an analyzer comprising:
        an accelerometer operable to measure forces of mechanical vibrations along at least two axes that are generated adjacent a surface of the circuit breaker during an operational event of the circuit breaker;
        a magnet operable to couple the accelerometer at a position to measure the forces of the mechanical vibrations that are generated adjacent the surface of the circuit breaker during the operational event of the circuit breaker;
        a leveling system using a gyroscope to determine orientation of the analyzer along least one axis;
        a first memory comprising:

a storage configured to receive and store a measured mechanical vibration signature of an operational event of the circuit breaker to be analyzed;

a second memory comprising:

a database configured to receive and store a known mechanical vibration signature of a known successful operational event for a type of circuit breaker similar to that to be analyzed; and a processor cooperating with the accelerometer, first memory, storage, second memory and database, the processor configured to:

determine the known mechanical vibration signature for the type of circuit breaker similar to that to be analyzed using the accelerometer to measure forces of mechanical vibrations along at least two axes that are generated adjacent a surface of the circuit breaker during the known successful operational event for the type of circuit breaker similar to that to be analyzed, wherein the type of circuit breaker similar to that to be analyzed has one or more known properties, wherein the one or more known properties include one or more of a new circuit breaker, a used circuit breaker, a circuit breaker operated in a test position, a circuit breaker operated in a location separate from a switchgear, a circuit breaker having sufficient vacuum seal, and a circuit breaker with a known defect;

store the known mechanical vibration signature in the database;

determine the measured mechanical vibration signature of the operational event for the circuit breaker to be analyzed using the accelerometer to measure forces of mechanical vibrations along at least two axes that are generated adjacent a surface of the circuit breaker to be analyzed during the operational event of the circuit breaker to be analyzed;

store the measured mechanical vibrations in the storage; and compare the measurements of the forces of the mechanical vibrations generated at the surface of the circuit breaker during the operational event with the known mechanical vibration signature of the operational event to determine a mechanical status and/or a mechanical specific status of the circuit breaker based at least in part on the comparison.

2. The vibration analysis system according to claim 1, further comprising:

a display operable to generate a graphical representation of the measurements of the forces of the mechanical vibrations generated at the surface of the circuit breaker during the operational event.

3. The vibration analysis system according to claim 2, wherein the display is operable to generate the graphical representation of the measurements of the forces generated along at least two axes.

4. The vibration analysis system according to claim 2, further comprising:

the leveling system operable to graphically display a level on the display.

5. The vibration analysis system according to claim 2, wherein the accelerometer, the memory, the database, the processor, and the display are all integrated into one device as part of a smart device that is implemented using one or more from the group that includes a smartphone and a tablet computing device.

6. The vibration analysis system according to claim 1, further comprising:

a coupling to position the accelerometer at a location to measure the forces of the mechanical vibrations that are generated adjacent the surface of the circuit breaker during the operational event of the circuit breaker.

7. The vibration analysis system according to claim 6, wherein the coupling includes at least one from the group that includes a strap, a suction cup, a hook and loop fastener, or an adhesive.

8. The vibration analysis system according to claim 1, wherein the storage is configured to receive and store data identifying the type of circuit breaker being analyzed.

9. The vibration analysis system according to claim 1, wherein the accelerometer is a three axes or less accelerometer that measures forces at a rate of about 400 hertz or less.

10. The vibration analysis system according to claim 1, wherein the accelerometer is an acoustic accelerometer.

11. The vibration analysis system according to claim 1, wherein the operational event of the circuit breaker includes one or more operational events from the group that includes opening or tripping of the circuit breaker, charging of the circuit breaker, and closing of the circuit breaker.

12. The vibration analysis system according to claim 1, wherein the processor is configured to use pattern recognition to compare the measurements of the forces of the mechanical vibrations generated at the surface of the circuit breaker during the operational event with the known mechanical vibration signature to determine a mechanical status of the circuit breaker based at least in part on the comparison.

13. The vibration analysis system according to claim 1, wherein the circuit breaker with the known defect includes a known defect in one or more of the following from the group that includes a part, a gear, a tooth, a bearing, a spring, a hardened material, a charging system, a lubrication quality, a lubrication quantity, and a vacuum seal.

14. The vibration analysis system according to claim 1, wherein the accelerometer and the storage are provided in one housing, and the database and the processor are provided at a separate location.

15. The vibration analysis system according to claim 14, further comprising:

a wireless communication system operable to transmit the measurements of the forces of the mechanical vibrations generated at the surface of the circuit breaker during the operational event to the separate location.

16. The vibration analysis system according to claim 1, wherein the determination of the mechanical status of the circuit breaker includes at least one of good, bad, pass, fail, repair, recheck, replace, defective, invalid reading, invalid test, retest later, or replace part and wherein the determination of the mechanical specific status of the circuit breaker includes at least one of defect in a tooth, defect in a spring, defect in a hardened material, defect in a charging system, defect in a lubrication quality, defect in a lubrication quantity, or loss of a vacuum seal.

17. The vibration analysis system according to claim 1, wherein the mechanical status of the circuit breaker is determined at a separate location.

18. A method for performing vibration analysis of operation of a circuit breaker to analyze a mechanical condition of the circuit breaker, the method comprising:

providing the vibration analysis system of claim 1;

placing the analyzer adjacent the circuit breaker to be analyzed;

measuring mechanical vibrations generated during the operational event of the circuit breaker to be analyzed using the accelerometer of the analyzer;

recording the measured mechanical vibrations generated during the operational event of the circuit breaker to be analyzed using the first memory of the analyzer;

comparing the recorded mechanical vibrations of the operational event of the circuit breaker to be analyzed to one or more known good mechanical vibration signatures of the operational event for a type of circuit breaker similar to that to be analyzed;

comparing the recorded mechanical vibrations of the operational event of the circuit breaker to be analyzed to one or more known bad mechanical vibration signatures of the operational event for a type of circuit breaker similar to that to be analyzed; and determining a status of the circuit breaker to be analyzed based at least in part upon the comparison to the one or more known good mechanical vibration signatures and the comparison to the one or more known bad mechanical vibration signatures, wherein determining the status of the circuit breaker includes at least one of good, bad, pass, fail, repair, recheck, replace, defective, invalid reading, invalid test, retest later, or replace part; and if the determined status of the of the circuit breaker includes at least one of bad, fail, repair, replace, defective or replace part, determining a specific status of the circuit breaker to be analyzed based upon the comparison to the one or more known bad mechanical vibration signatures, wherein the specific status of the circuit breaker includes at least one of defect in a tooth, defect in a spring, defect in a hardened material, defect in a charging system, defect in a lubrication quality, defect in a lubrication quantity, or loss of a vacuum seal.

19. The method according to claim 18, wherein placing the analyzer adjacent the circuit breaker to be analyzed includes coupling the analyzer to at least a portion of the circuit breaker so that the analyzer is in mechanical vibration communication with the circuit breaker.

20. The method according to claim 19, wherein coupling the analyzer to at least a portion of the circuit breaker includes using at least one or more from the group that includes a strap, a suction cup, a hook and loop fastener, or an adhesive.

21. The method according to claim 19, wherein coupling the analyzer to at least a portion of the circuit breaker includes holding the analyzer in contact with a portion of the circuit breaker.

22. The method according to claim 19, wherein coupling the analyzer to at least a portion of the circuit breaker includes holding the analyzer in contact with a portion of an external portion of a case of the circuit breaker.

23. The method according to claim 19, wherein coupling the analyzer to at least a portion of the circuit breaker includes leveling the analyzer along at least one dimension.

24. The method according to claim 18, further comprising:
inputting the type of circuit breaker for use in identifying the one or more known mechanical vibration signatures of the operational event for the type of circuit breaker similar to that being analyzed.

25. The method according to claim 24, wherein inputting the type of circuit breaker includes using at least one from the group that includes data entry, bar code scan, optical reader, rf tag reader, or identification tag.

26. The method according to claim 18, wherein the accelerometer is a three axes or less accelerometer that measures forces at a rate of about 400 hertz or less.

27. The method according to claim 18, wherein the accelerometer is an acoustic accelerometer.

28. The method according to claim 18, further comprising:
generating and storing a known mechanical vibration signature of the operational event for the circuit breaker using the analyzer.

29. The method according to claim 18, wherein the operational event of the circuit breaker includes one or more operational events from the group that includes opening or tripping of the circuit breaker, charging of the circuit breaker, or closing of the circuit breaker.

30. The method according to claim 18, wherein comparing the measured and recorded mechanical vibrations of the operational event of the circuit breaker to one or more known mechanical vibration signatures of the operational event for the type of circuit breaker similar to that being analyzed includes using a pattern recognition algorithm.

31. The method according to claim 18, wherein comparing the measured and recorded mechanical vibrations of the operational event of the circuit breaker to one or more known mechanical vibration signatures of the operational event for the type of circuit breaker similar to that being analyzed includes a visual comparison.

32. The method according to claim 18, wherein comparing the measured and recorded mechanical vibrations of the operational event of the circuit breaker to one or more known mechanical vibration signatures of the operational event for the type of circuit breaker similar to that being analyzed includes aligning the measured and recorded vibrations of the operational event with that of the one or more known mechanical vibration signatures.

33. The method according to claim 18, wherein the one or more known mechanical vibration signatures of the operational event are stored in memory at the analyzer.

34. The method according to claim 18, wherein the one or more known mechanical vibration signatures of the operational event are stored remotely.

35. The method according to claim 1, further comprising:
sending the recorded mechanical vibrations of the operational event of the circuit breaker to a remote location, and wherein the comparing the measured and recorded mechanical vibrations of the operational event of the circuit breaker to one or more known mechanical vibration signatures of the operational event for the type of circuit breaker similar to that being analyzed are performed at the remote location.

36. The method according to claim 18, wherein determining the status of the circuit breaker based upon the comparison is performed at the analyzer.

37. The method according to claim 18, wherein determining the status of the circuit breaker is performed remote from the analyzer.

38. The method according to claim 18, further comprising:
transmitting the status of the circuit breaker to a user electronically.

39. The method according to claim 38, wherein transmitting the status is performed at the analyzer.

40. The method according to claim 38, wherein transmitting the status is performed remote from the analyzer.

41. The method according to claim 18, wherein the analyzer is a smart device that is implemented using one or more from the group that includes a smartphone and a tablet computing device.

42. The method according to claim 18, wherein the one or more known mechanical vibration signatures of the operational event for this type of circuit breaker are generated and stored using the analyzer to test a circuit breaker multiple times.

43. The method according to claim 18, further comprising:

generating and storing a known mechanical vibration signature for one or more circuit breakers for the operational event using the analyzer, and wherein the one or more circuit breakers have one or more known properties.

44. The method according to claim 43, wherein the one or more known properties of the one or more circuit breakers include one or more of the following from the group that includes a new circuit breaker, a used circuit breaker, a circuit breaker operated in a test position, a circuit breaker operated in a location separate from a switchgear, a circuit breaker having sufficient vacuum seal, and a circuit breaker with a known defect.

45. The method according to claim 44, wherein the circuit breaker with the known defect includes a known defect in one or more of the following from the group that includes a part, a gear, a tooth, a bearing, a spring, a hardened material, a charging system, a lubrication quality, a lubrication quantity, and a vacuum seal.

* * * * *